(12) United States Patent
Wahba

(10) Patent No.: US 11,459,783 B2
(45) Date of Patent: *Oct. 4, 2022

(54) SYSTEM AND METHOD OF DAMPING VIBRATIONS OF TOWER STRUCTURES

(71) Applicant: Turris Corp., Georgetown (CA)

(72) Inventor: John M. F. Wahba, Mississauga (CA)

(73) Assignee: Turris Corp., Georgetown (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/402,867

(22) Filed: Aug. 16, 2021

(65) Prior Publication Data
US 2021/0372155 A1 Dec. 2, 2021

Related U.S. Application Data

(62) Division of application No. 16/550,882, filed on Aug. 26, 2019, now Pat. No. 11,124,984.

(51) Int. Cl.
| | |
|---|---|
| *E04H 9/02* | (2006.01) |
| *F16F 7/10* | (2006.01) |
| *F16F 15/023* | (2006.01) |
| *F16F 9/10* | (2006.01) |

(52) U.S. Cl.
CPC .......... *E04H 9/0215* (2020.05); *F16F 7/1034* (2013.01); *F16F 15/023* (2013.01); *F16F 9/10* (2013.01)

(58) Field of Classification Search
CPC .......... F16F 7/1034; F16F 15/023; F16F 9/10; E04H 9/0215; E04H 9/0235; E04B 1/98
See application file for complete search history.

(56) References Cited

U.S. PATENT DOCUMENTS

| | | | | | |
|---|---|---|---|---|---|
| 4,783,937 | A | * | 11/1988 | Sato | ........................ E01D 11/02 52/168 |
| 4,873,798 | A | * | 10/1989 | Sato | ....................... E04H 9/0215 52/168 |
| 4,875,313 | A | * | 10/1989 | Sato | ....................... E04H 9/0215 52/167.2 |
| 4,922,671 | A | * | 5/1990 | Sato | ....................... F16F 15/023 52/167.2 |
| 4,924,639 | A | * | 5/1990 | Sato | ....................... E04H 9/0215 52/168 |

(Continued)

FOREIGN PATENT DOCUMENTS

GB 1322807 A * 7/1973

*Primary Examiner* — Adriana Figueroa
(74) *Attorney, Agent, or Firm* — Carlson, Gaskey & Olds, P.C.

(57) ABSTRACT

A system for damping vibration of a tower structure at a selected one or more natural frequencies of the tower structure. The system includes a tank assembly with one or more tanks, and a fluid positioned in the tank to a preselected depth above a floor. The tank includes wall(s) defining an average travelling distance of a wave through the fluid initiated by the vibration of the tower structure at the natural frequency. The system includes one or more inserts located on the floor in the tank for damping movement of the fluid. The preselected depth and the average travelling distance are selected so that the fluid is movable at the selected natural frequency and out of phase with the vibration of the tower structure, to dampen the vibration of the tower structure at the selected natural frequency.

19 Claims, 22 Drawing Sheets

(56) References Cited

U.S. PATENT DOCUMENTS

| | | | | |
|---|---|---|---|---|
| 4,951,441 A | * | 8/1990 | Noji | E04H 9/0215 |
| | | | | 52/168 |
| 2017/0009447 A1 | * | 1/2017 | Love | F16F 7/1034 |

* cited by examiner

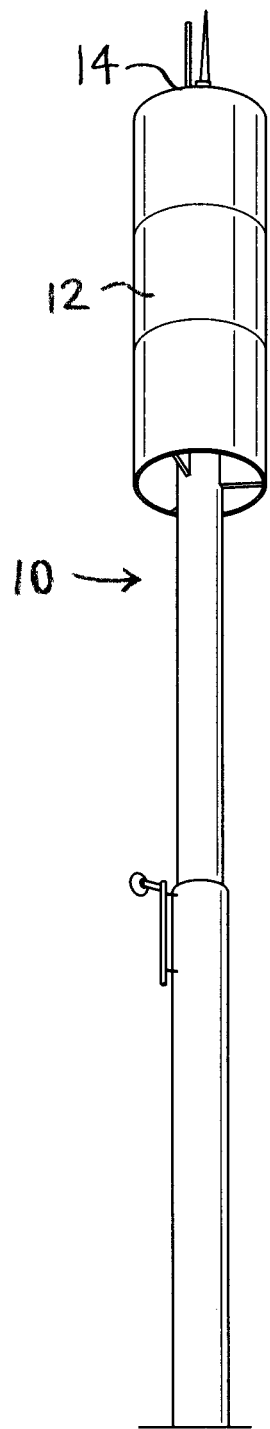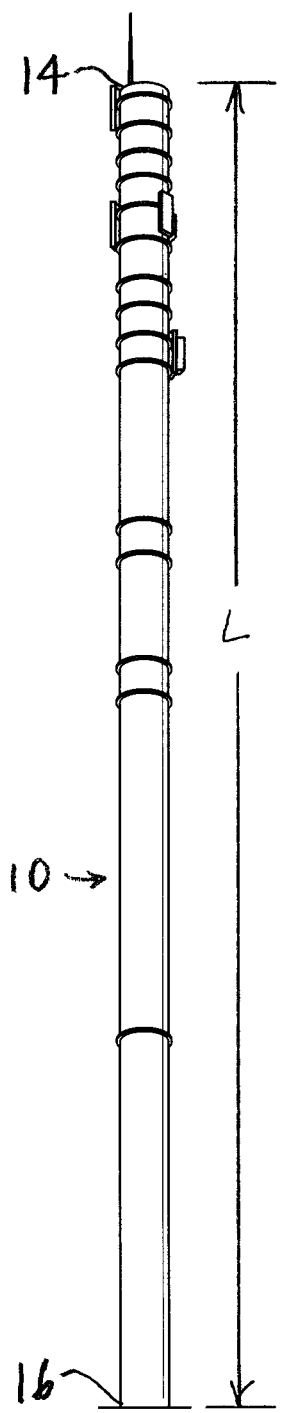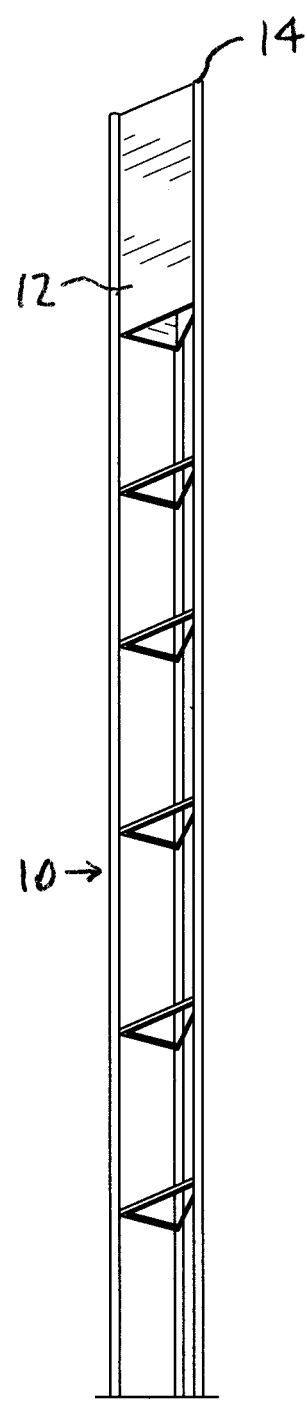
FIG. 1A
(PRIOR ART)
FIG. 1B
(PRIOR ART)
FIG. 2
(PRIOR ART)

SYSTEM AND METHOD OF DAMPING VIBRATIONS OF TOWER STRUCTURES

FIELD OF THE INVENTION

The present invention is a system and a method of damping vibration of a tower structure at one or more natural frequencies thereof.

BACKGROUND OF THE INVENTION

Relatively lightweight structures such as poles and towers (e.g., communication towers used for radio or cell phone communications purposes or lighting masts) may be subject to cross-wind vibrations. These vibrations have a detrimental impact on the fatigue life of the structures. As is well known in the art, vibration of the tower structure at one or more natural frequencies thereof are of particular concern.

The tower structures have relatively small masses, and may be, for example, approximately 50 feet to 2,000 feet high. Tower structures that are either circular, semi-circular or triangular in cross-section are considered susceptible to these types of vibrations.

In general, the communications or other devices supported by the tower structure are located at the top of the tower, or near the top of the tower. Recently, it has become common for the tower structure to include a shroud or housing formed and positioned to enclose the communications or other devices, e.g., at the top of the tower. However, it has been found that the shrouded towers tend to be somewhat more susceptible to vibrations, and consequently metal fatigue. Accordingly, the problem of addressing metal fatigue in poles and towers appears to be generally becoming a more pressing issue.

Tower structures of the prior art are identified by reference character 10 in FIGS. 1A-2. As can be seen in FIG. 1A, the tower structure 10 includes a shroud 12 at, or proximal to, a top end 14 of the tower structure.

Another prior art tower structure 10 is illustrated in FIG. 1B. In FIG. 1B, a base 16 of the tower structure 10 is also shown. The tower structure has a length "L" extending between the base 16 and the top end 14 (FIG. 1B).

The prior art tower structure 10 that is illustrated in FIG. 2 is three-sided, rather than circular in cross-section. The tower structure 10 of FIG. 2 includes a shroud 12 at, or proximal to, the top end 14 of the tower structure. (As will be described, embodiments of the invention are illustrated in the balance of the attached drawings.)

Referring to FIG. 1B, it can be seen that the top end 14 of the tower structure 10 is free, and the base 16 is secured in the ground. Accordingly, when the tower structure 10 vibrates, the greatest amplitudes thereof typically are at or near the top end. As is well known in the art, the metal fatigue tends to be most pronounced at or near the base 16, because the portion of the tower structure at or in the ground is fixed, and unable to move, although the balance of the tower structure is able to move.

In general, the metal fatigue is most serious at or near the base. If not addressed, the tower ultimately will fail.

SUMMARY OF THE INVENTION

There is a need for a system and a method for damping vibration of a tower structure at one or more natural frequencies thereof that overcomes or mitigates one or more of the disadvantages or defects of the prior art. Such disadvantages or defects are not necessarily included in those listed above.

In its broad aspect, the invention provides a system for damping vibration of a tower structure at one or more natural frequencies of the tower structure. The system includes one or more tank assemblies with one or more tanks having a floor and one or more walls, and a fluid positioned in the tank to a preselected depth above the floor, the fluid in the tank occupying a tank volume. The wall is formed to define one or more average travelling distances of a wave through the fluid initiated by the vibration of the tower structure at the natural frequency. The system also includes one or more inserts located on the floor in the tank for damping movement of the fluid. The insert has a top edge thereof at a preselected height above the floor. The preselected depth of the fluid is greater than the preselected height of the insert, to enable the wave to move through the fluid located in the tank along the average travelling distance. The preselected depth and the average travelling distance are selected so that the fluid is movable at the one or more selected ones of the natural frequencies and out of phase with the vibration of the tower structure at the one or more selected ones of the natural frequencies, to dampen the vibration of the tower structure.

In another of its aspects, the invention provides a system for damping vibration of a tower structure at one or more natural frequencies of the tower structure, the tower structure having three sides. The system includes one or more tank assemblies with one or more tanks having a floor and one or more tank walls, and a fluid positioned in the tank to a preselected depth above the floor, the fluid in the tank occupying a tank volume. The system also includes one or more inserts located on the floor in the tank, the insert having a top edge thereof at a preselected height above the floor. The tank wall is formed to define an average tank travelling distance of a tank wave through the fluid in the tank. The preselected depth is greater than the preselected height of the insert, to enable the tank wave to move through the fluid located in the tank along the average tank travelling distance. The preselected depth and the average tank travelling distance are selected so that the fluid in the tank is movable at a selected frequency that is the same as a selected one of the natural frequencies at which the tower structure vibrates, wherein the fluid in the tank is movable at the selected natural frequency and out of phase with the vibration of the tower structure at the selected natural frequency, to dampen the vibration of the tower structure at the selected natural frequency.

In another of its aspects, the invention provides a tower system including a tower structure extending between a base and a top end, the tower structure being subject to vibration at one or more natural frequencies and a system for damping the vibration, the system being located on the tower structure. The system includes one or more tank assemblies with one or more tanks having a floor and one or more walls. The system also includes a fluid positioned in the tank to a preselected depth above the floor, the fluid in the tank occupying a tank volume, and one or more inserts located on the floor in the tank for damping movement of the fluid, the insert having a top edge thereof at a preselected height above the floor. The tank is formed to define an average travelling distance of a tank wave through the fluid in the tank. The preselected depth is greater than the preselected height, to enable the tank wave to move through the fluid located in the tank along the average travelling distance. The preselected depth and the average travelling distance are selected so that the fluid in the tank volume is movable at a selected frequency that is the same as a selected one of the one or more natural frequencies and out of phase with the vibration of the tower structure at the selected one of the natural frequencies, to dampen the vibration of the tower structure.

In another of its aspects, the invention provides a method of determining one or more natural frequencies of a tower structure and structural damping thereof, the tower structure extending above ground level between a base at the ground level and a top end. The method includes securing one or more accelerometers to the tower structure at one or more locations thereon proximal to the top end, and causing the tower structure to vibrate at the one or more natural frequencies. With the accelerometer, acceleration data resulting from vibration of the tower structure at the natural frequencies is obtained. The acceleration data is transmitted from the accelerometer to a processor. With the processor, the acceleration data is processed to determine the one or more natural frequencies, and the structural damping thereof.

In yet another of its aspects, the invention provides a method of determining one or more natural frequencies of a tower structure and structural damping thereof, the tower structure extending above ground level between a base at the ground level and a top end. The method includes securing a first accelerometer to the tower structure at a first location proximal to the top end, and securing a second accelerometer to the tower structure at a second location at a preselected distance below the top end. The tower structure is caused to vibrate at the one or more natural frequencies. With the first accelerometer, first location acceleration data at the first location resulting from vibration of the tower structure at the one or more natural frequencies is obtained. With the second accelerometer, second location acceleration data at the second location resulting from vibration of the tower structure at the one or more natural frequencies is obtained. The first and second location acceleration data is transmitted from the first accelerometer and the second accelerometer respectively to a processor. With the processor, the first and second location acceleration data is processed to determine the natural frequencies and the structural damping.

In another of its aspects, the invention provides a method of assessing a system for damping vibration of a tower structure at one or more actual natural frequencies of the tower structure and actual structural damping thereof, the tower structure extending between a base and a top end, the system being located proximal to the top end, and an initial structural damping prior to the installation of the system on the tower structure being known. The method includes determining one or more theoretical natural frequencies of the tower structure with the system installed thereon, and securing one or more accelerometers to the tower structure at a first location thereon. The tower structure is caused to vibrate at the one or more actual natural frequencies. With the accelerometer, acceleration data resulting from vibration of the tower structure at the one or more actual natural frequencies is obtained. The acceleration data is transmitted from the accelerometer to a processor. With the processor, the acceleration data is processed to determine the one or more actual natural frequencies of vibration of the tower structure with the system installed thereon, and the actual structural damping thereof. With the processor, the one or more actual natural frequencies is compared to the one or more theoretical frequencies, and the actual structural damping is compared to the initial structural damping.

BRIEF DESCRIPTION OF THE DRAWINGS

The invention will be better understood with reference to the attached drawings, in which:

FIG. 1A (also described previously) is an isometric view of a shrouded tower of the prior art;

FIG. 1B (also described previously) is an isometric view of another shrouded tower of the prior art;

FIG. 2 (also described previously) is an isometric view of another shrouded tower of the prior art;

DETAILED DESCRIPTION

Figure 3A:
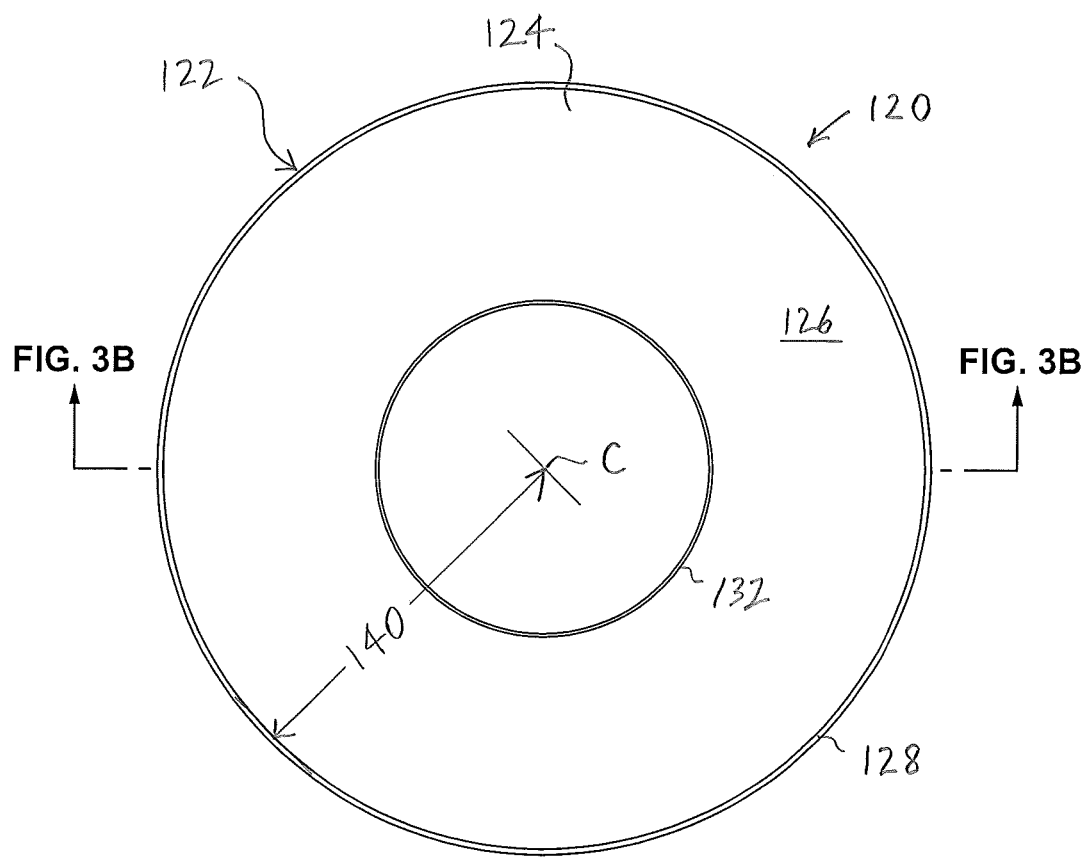
FIG. 3A is a top view of an embodiment of a system of the invention, drawn at a larger scale.

In the attached drawings, like reference numerals designate corresponding elements throughout. In particular, to simplify the description, the reference numerals previously used in FIGS. 1A-2 are used again in connection with the description of the invention hereinafter, except that each such reference numeral is raised by 100 (or whole multiples thereof, as the case may be) where the elements correspond to one or more of the elements illustrated in FIGS. 1A-2.

Figure 3B:
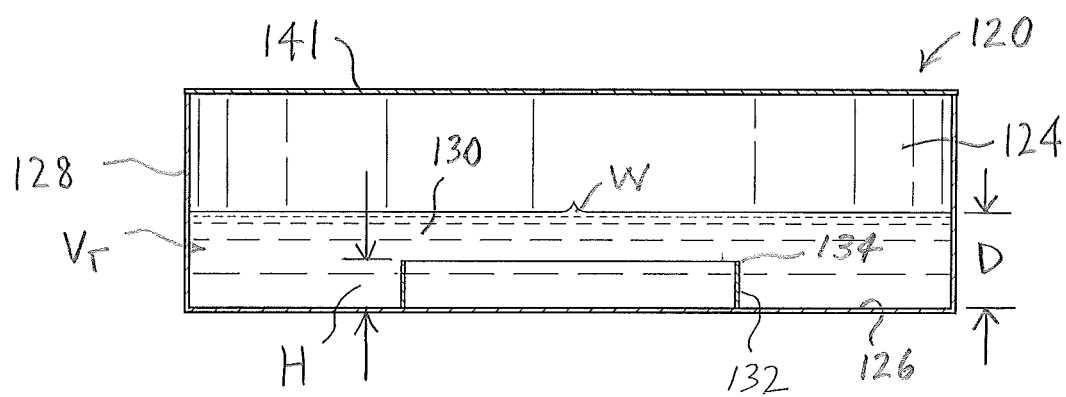
FIG. 3B is a cross-section of the system of FIG. 3A.

Reference is first made to FIGS. 3A-3D to describe an embodiment of the system of the invention indicated generally by the numeral 120. As will be described, the system 120 is for damping vibration of a tower structure 110 (FIG. 3C) at one or more natural frequencies of the tower structure 110. In one embodiment, the system 120 preferably includes one or more tank assemblies 122. The tank assembly 122 includes one or more tanks 124. The tank 124 has one or more floors 126 and one or more walls 128, as will be described. The embodiment of the tank assembly 122 illustrated in FIGS. 3A and 3B includes only the outer perimeter wall 128. As can be seen in FIG. 3B, the system 120 includes a fluid 130 positioned in the tank 124 to a preselected depth "D" above the floor 126. The fluid 130 in the tank 124 occupies a tank volume "$V_T$" (FIG. 3B). The wall 128 is formed to define one or more average travelling distances "TD" (FIG. 3D) of a wave "W" through the fluid 130 initiated by the vibration of the tower structure 110 at the one or more natural frequencies.

As shown in FIGS. 3A and 3B, the system 120 also includes one or more inserts 132 located on the floor 126 in the tank 124, for damping movement of the fluid 130. The insert 132 preferably has a top edge 134 thereof at a preselected height "H" above the floor 126 (FIG. 3B).

Those skilled in the art would appreciate that the tower structure 110 may be subject to vibration at more than one natural frequency thereof. Such vibration may be, for example, due to the wind acting upon the tower structure. However, as will be described, the system 120 is designed for suppression or attenuation of vibration of the tower structure 110 at a selected natural frequency thereof.

It is preferred that the preselected depth "D" of the fluid 130 is greater than the preselected height "H" of the insert 132, to enable the wave "W" to move through the fluid 130 along the travelling distance "TD". As will also be discussed, the preselected depth "D" and the travelling distance "TD" preferably are selected so that the fluid 130 is movable at a frequency that will interfere with the selected natural frequency when the structure is vibrating, to dampen the vibration of the tower structure 110 at that natural frequency. Preferably, the tank assembly 122 is configured so that the fluid moves at the selected natural frequency of the structure that is to be suppressed, however, the fluid's movement is out of phase relative to the movement of the structure, so that the fluid's movement dampens the vibration of the structure at the selected natural frequency.

It is also preferred that the tank assembly 122 includes a cover portion 141, covering the tank 124 (FIG. 3B). As can be seen in FIG. 3B, the cover portion 141 preferably is secured to, and supported by, the wall 128. In one embodiment, the cover portion 141 preferably includes an opening therein (not shown) through which the fluid 130 may be introduced into the tank 124. It will be understood that, for clarity of illustration, the cover portion 141 and the fluid 130 are omitted from FIG. 3A.

Figure 3C:
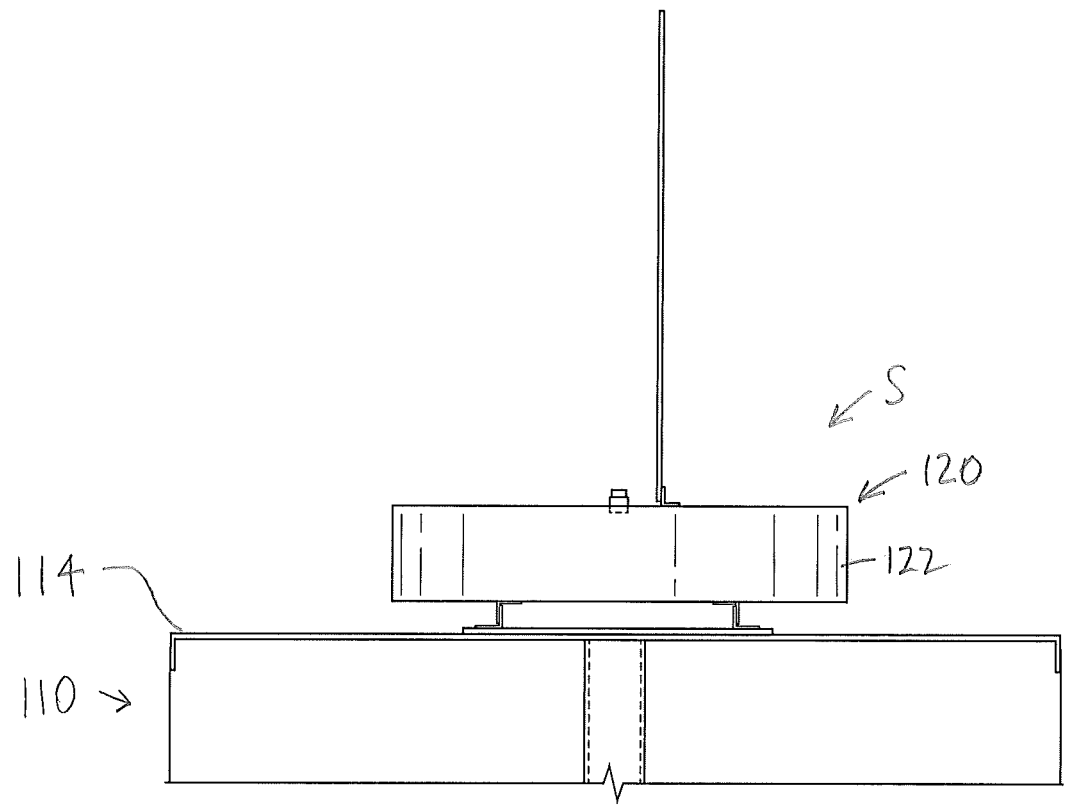
FIG. 3C is a side view of the system of FIGS. 3A and 3B mounted proximal to a top end of a tower structure, drawn at a smaller scale.

As can be seen in FIGS. 3A-3C, in one embodiment, the wall 128 of the tank 124 preferably is an outer perimeter wall that is defined by an outer perimeter radius 140 thereof centered on a center point "C" of the tank assembly 122.

As can be seen in FIG. 3A, the insert 132 preferably is centrally located on the floor 126, i.e., centrally located relative to the wall 128 that partially defines the tank 124. It is also preferred that the insert 132 is a circular ring.

Those skilled in the art would appreciate that the system 120 may be located on the tower structure 110 at any suitable location. As can be seen in FIG. 3C, in one embodiment, it is preferred that the tank assembly 122 is configured to be located on the tower structure 110 proximal to a top end 114 of the tower structure 110. Locating the system 120 at the top end 114, or proximal thereto, permits the system 120 to have the greatest damping effect on the vibration of the tower structure 110, i.e., as compared to locating the system 120 elsewhere (lower) on the tower structure 110. This is because, when the tower structure 110 vibrates, the amplitude of such vibration is the greatest at the top end 114 (i.e., the free end) of the tower structure 110.

It will be understood that, when the system 120 is mounted on the tower structure 110, the tank assembly 122 is secured to the tower structure 110, by any suitable means. For the purposes hereof, the tower structure 110, and the tank assembly 122 secured to it, are collectively referred to as a structure "S" (FIG. 3C).

Where it is intended to suppress or attenuate more than one natural frequency of the structure, then the system preferably is configured accordingly, as described further below. However, if only one natural frequency of the structure "S" is selected to be suppressed or attenuated, then the system 120 preferably is configured accordingly as illustrated in FIGS. 3A-3D, i.e., to dampen vibrations at only one natural frequency of the structure. The system 120 illustrated in FIGS. 3A-3D is for damping vibrations of the tower structure 110 at one selected natural frequency thereof.

Figure 3D:
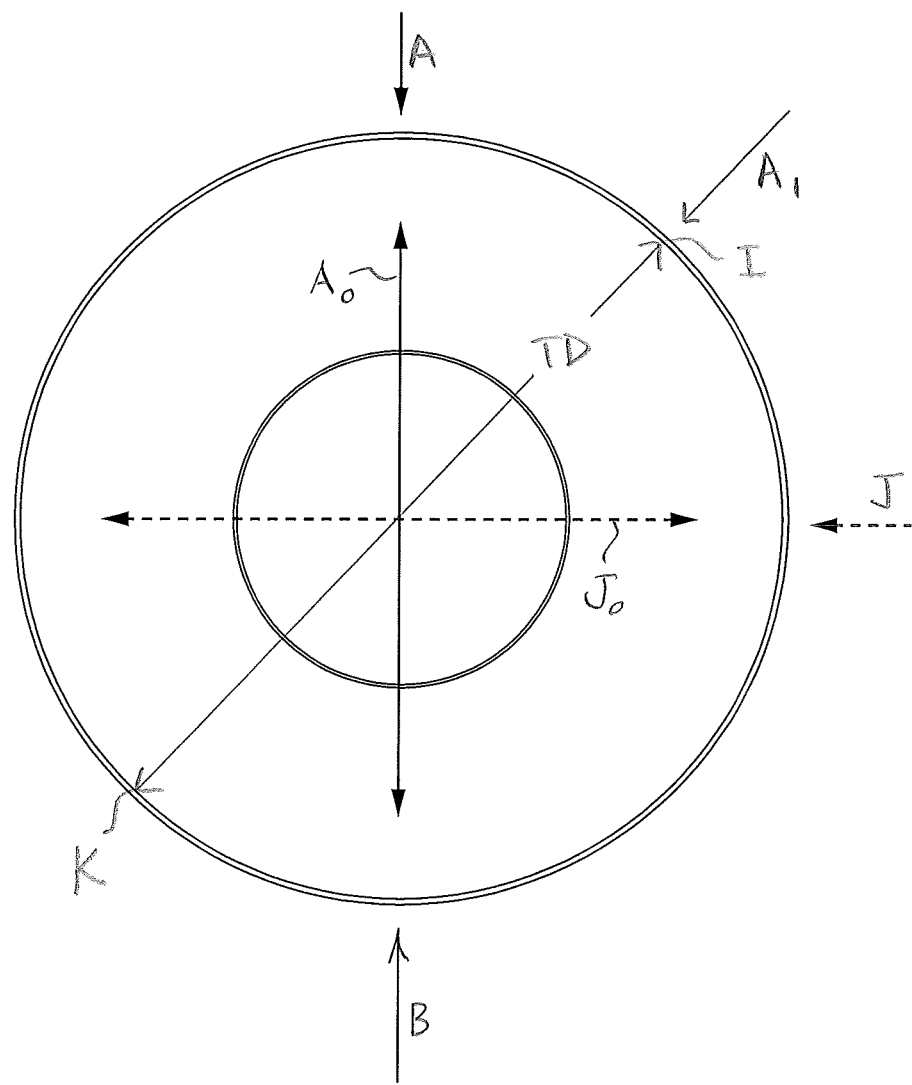
FIG. 3D is another top view of the system of FIG. 3A, drawn at a smaller scale.

For instance, if the structure "S" is initially moved in a first direction indicated by arrow "A" in FIG. 3D, then the fluid 130 moves in a direction opposite to the first direction. As will be described, after moving as far as possible in the first direction, the structure moves in an opposite second direction, i.e., the structure vibrates. However, due to the travelling distance "TD" in the tank 124 and the depth "D" of the fluid 130, the fluid 130 moves in the direction opposite to the direction of travel of the structure at a frequency that is the same as (or substantially the same as) the natural frequency of the structure that is to be suppressed. The wave action of the fluid interferes with the movement of the tower structure 110 at the natural frequency, thereby dampening movement of the tower structure 110 at the natural frequency.

The travelling distance "TD" is the distance that the wave "W" travels across the tank 124. It will be understood that, to simplify the description, only one wave is described and illustrated, although a succession of waves would be generated in practice by vibration of the structure "S". The direction of movement by the structure "S" may be any direction. For example, in FIG. 3D, when the structure "S" is pushed in the direction indicated by arrow "$A_1$", the wave travels across the tank 124, from one location "I" at the wall 128 to a radially opposed location "K", on the other side of the tank 124.

In FIG. 3D, other exemplary directions of travel initiated by winds or other forces are indicated by arrows "A" and "J".

It will be understood that the tank assembly 122, being secured to the tower structure 110, moves with the tower structure 110. It is believed that the fluid 130 commences moving in the direction opposite to the direction in which the structure "S" moves at the same time as the structure "S" moves. The sloshing motion of the fluid 130 moves in the opposite direction, so that its movement is out of phase relative to the movement of the tower structure in such direction, e.g., the direction indicated by arrow "A". Part of the damping effect of the system 120 may be attributed to the out of phase motion with respect to the structure "S" (i.e., the tower structure, and the tank assembly secured to it).

It will be understood that the movement of the structure "S" may, for example, be due to wind pushing on the structure "S". An initial movement of the structure "S" in the direction indicated by arrow "$A_1$" generates the wave "W" in the fluid 130, travelling the travelling distance "TD" in the direction indicated by the arrow "$A_1$".

In this example, after the structure "S" is initially moved in one direction (for example, as indicated by arrow "A" in FIG. 3D), the structure "S" then moves subsequently in a second (opposite) direction indicated by arrow "B" in FIG. 3D, i.e., the tower structure 110 is vibrating, at a natural frequency thereof. However, when the tower structure 110 moves in the second direction, then the fluid 130 also moves, in a direction opposite to the second direction. Accordingly, the movement of the fluid 130 in the direction opposite to the second direction also tends to dampen the vibration of the tower structure at the natural frequency.

When the structure "S" (i.e., the tower structure 110, and the tank assembly 122 secured to it) changes its direction of travel (i.e., from the first direction to the second direction), the fluid 130 changes its direction of travel, opposite to the direction of travel of the structure "S". There is an out of phase difference between the structure's change in direction, and the fluid's change in direction, and it is believed that this out of phase motion contributes to the damping effect of the system 120.

Those skilled in the art would also appreciate that, when the tower structure vibrates, the shift between movement of the structure "S" in the first direction to movement thereof in the second direction is relatively rapid. As noted above, that corresponds to a change in direction of travel of the fluid 130 (i.e., from the first direction to the second direction). The initial amplitude of the vibration at the top end 114 may be relatively small. Also, the vibration of the tower structure 110 may persist for some time, with the dampening of such vibration by the system 120 causing a gradual decrease in the amplitude of the vibration until the vibration ceases.

In summary, while the tower structure vibrates, it is frequently changing its direction of travel. As described above, the fluid moves at the same frequency as the structure, but in a direction opposite to the structure's direction, and because of this, the fluid is out of phase relative to the structure's movement. From the foregoing, it can be seen that the movement of the fluid, which is caused by movement of the structure, is a sloshing motion, i.e., the fluid's direction of travel changes when the structure's direction of travel changes. It is believed that the sloshing motion of the fluid also changes its direction of travel with changes in the direction of movement of the structure "S" over time. This also enhances the damping effect of the system 120.

The movement of the structure may be in any direction. As examples, in FIG. 3D, arrow "A" indicates one direction in which motion of the structure may be initiated, and arrow "J" indicates another direction in which motion of the structure may be initiated. The sloshing motion of the fluid 130, in response to the movement of the structure initiated in the direction indicated by arrow "A", is generally indicated by the arrow "$A_O$" (FIG. 3D). The sloshing motion of the fluid 130, in response to movement of the structure initiated in the direction indicated by arrow "J", is generally indicated by the arrow "$J_O$". The arrows "$A_O$" and "$J_O$" are two-headed arrows, to indicate that the fluid is subjected to the sloshing motion, due to the vibrating motion of the structure.

It will be understood that the vibration of the tower structure may be initiated, for example, by winds acting upon the tower structure. It will also be understood that the foregoing description of the movement of the wave "W" through the fluid 130 is simplified, for clarity of illustration. Those skilled in the art would appreciate that, in practice, the structure "S" may be subjected to a number of vibrations, at a number of frequencies, causing numerous movements of the fluid 130.

From FIGS. 3A and 3B, it can be seen that, advantageously, the system 120 is configured to respond in the same way to vibration of the tower structure that is initiated in any direction, due to the outer perimeter wall 128 and the insert 132 being circular in plan view. In particular, because the wall 128 is circular in the system 120 illustrated in FIGS. 3A-3D, the travelling distance "TD" of the wave "W" is the same in any direction.

The fluid 130 may be any suitable fluid. In one embodiment, the fluid 130 preferably includes a mixture of water and an anti-freeze liquid. For example, the anti-freeze liquid may be glycol.

The water and the anti-freeze liquid may be mixed together in any suitable proportions. For instance, in one embodiment, the fluid 130 preferably includes approximately 40 percent water by mass and approximately 60 percent anti-freeze liquid by mass.

As a practical matter, it is preferred that the level of the fluid 130 in the tank 124 is checked from time to time, e.g., once every four or five years. It is believed that, over time, some water vapor may escape, so that there may be a small loss of fluid volume due to evaporation.

Those skilled in the art would appreciate that the preselected height "H" of the insert 132 and the preselected depth "D" of the fluid 130 may be any suitable dimensions respectively, as needed to dampen the vibration of the tower structure 110 at the natural frequency thereof that is to be suppressed or attenuated. The preselected depth "D" of the fluid 130 preferably is greater than the preselected height "H" of the insert 132. It is believed that, where the preselected height "H" is between about 40 percent and about 60 percent of the preselected depth "D", improved damping results are achieved. For instance, in one embodiment, the preselected height "H" of the insert 132 preferably is approximately 50 percent of the preselected depth "D" of the fluid 130.

The insert 132 appears to provide a surprisingly effective improvement on the damping effect that may be provided in the absence of the insert. Based on testing done to date, it appears that including the insert causes the system to be 2.5 to three times more effective at damping the vibrations.

As described above, the system 120 illustrated in FIGS. 3A-3D is for damping vibration of the tower structure 110 at one natural frequency thereof. However, as noted above, depending on the circumstances, the tower structure may be subject to vibration at more than one natural frequency.

An alternative embodiment of the system 220 that is illustrated in FIGS. 5A-5D is for damping vibration of a tower structure 210 (FIG. 5C) at two natural frequencies, i.e., a first natural frequency, and a second natural frequency. It will be understood that the first and second natural frequencies differ substantially, the first natural frequency being a relatively lower frequency, and the second natural frequency being a relatively higher frequency. The system 220 is designed to suppress or attenuate vibration of the tower structure 210 at the two selected natural frequencies of the structure.

Figure 5A:
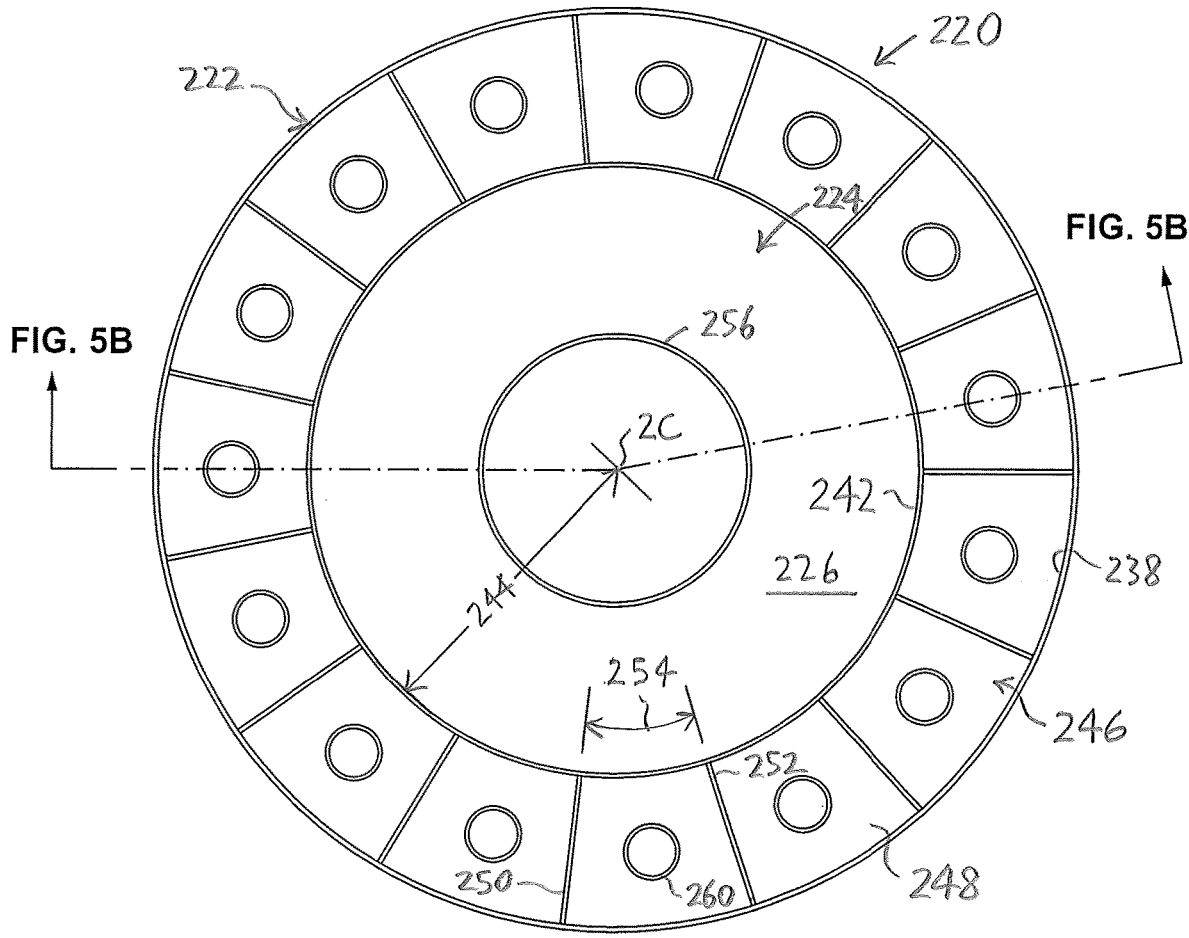
FIG. 5A is a top view of another alternative embodiment of the system of the invention.

As can be seen in FIG. 5A, in one embodiment, the system 220 preferably includes a tank assembly 222 having a floor 226 and a circular intermediate wall 242 having an intermediate wall radius 244 centered on a center point "2C" of the tank assembly 222 thereof. The tank assembly 222 preferably also includes one or more tanks. In one embodiment, the tank assembly 222 preferably includes an outer tank subassembly 246 that is positioned between the intermediate wall 242 and an outer perimeter wall 238, and an inner tank 224, defined by the intermediate wall 242. Preferably, the outer tank subassembly 246 includes a number of outer tank compartments 248. It is also preferred that each of the outer tank compartments 248 is defined by first and second walls 250, 252 between the intermediate wall and the outer perimeter wall that are radially aligned with the center point and spaced apart by a predetermined radial distance 254 at the intermediate wall 242 (FIG. 5A).

Accordingly, the tanks included in the tank assembly 222 are the inner tank 224 and the outer tank compartments 248. It is preferred that inserts are positioned in each of the inner tank and in the outer tank compartments 248.

Preferably, the system 220 includes an inner insert 256 centered on the center point "2C", the inner insert 256 having an inner insert top edge 258 at a preselected inner insert height 259 above the floor 226. The inner insert 256 preferably is centrally located in the inner tank 224 (FIGS. 5A, 5B).

As can be seen in FIG. 5A, the system 220 preferably also includes a number of outer inserts 260. The outer inserts 260 preferably are centrally located in each of the outer tank compartments 248 respectively, on outer portions 262 of the floor 226. Each of the outer inserts 260 preferably has an outer insert top edge 264 located at a preselected outer insert height 266 above the outer portion 262 of the floor 226 (FIG. 5B).

The system 220 preferably also includes a fluid 230 that is located in the inner tank 224 to a preselected first depth 268 above the floor 226. The fluid 230 in the inner tank 224 occupies an inner tank volume "$V_{IT}$".

Figure 5B:
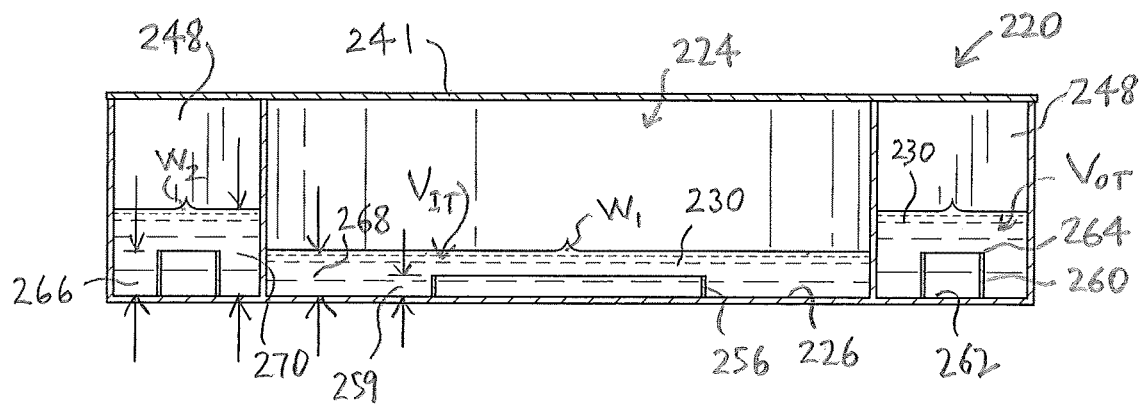
FIG. 5B is a cross-section of the system of FIG. 5A.

Preferably, the fluid 230 is also located in the outer tank compartments 248 to a preselected second depth 270 therein above the outer portion 262 of the floor 226 (FIG. 5B). The fluid 230 in each of the outer tank compartments 248 occupies an outer tank compartment volume "$V_{OT}$".

The intermediate wall 242 preferably is formed to define an average travelling distance "$TD_1$" (FIG. 5D) of an inner tank wave "$W_1$" (FIG. 5B) through the fluid 230 in the inner tank 224. Also, each of the outer tank compartments 248 is formed to define an average travelling distance "$TD_2$" (FIG. 5D) of an outer tank wave "$W_2$" (FIG. 5B) through the fluid 230 in each of the outer tank compartments 248.

The preselected first depth 268 of the fluid 230 is greater than the preselected inner insert height 259, to enable the inner wave "$W_1$" to move through the fluid located in the inner tank 224 along the travelling distance "$TD_1$" (FIG. 5B).

The preselected second depth 270 is greater than the preselected outer insert height 266, to enable the outer tank wave "$W_2$" to move through the fluid 230 located in each of the outer tank compartments 248 along the travelling distance "$TD_2$" in each compartment (FIG. 5B).

The preselected first depth 268 and the average inner travelling distance "$TD_1$" preferably are selected so that the fluid 130 in the inner tank is movable at the first natural frequency, so that the movement of the fluid out of phase with the structure's vibration at the second natural frequency dampens vibration of the tower structure 210 at the first natural frequency.

Also, the preselected second depth 270 of the fluid 230 and the average travelling distance "$TD_2$" preferably are selected so that all the fluid 230 that collectively constitutes all of the outer tank compartment volumes "$V_{OT}$" is movable at the second natural frequency, so that movement of the fluid out of phase with the structure's vibration at the second natural frequency dampens vibration of the tower structure at the second natural frequency.

It is also preferred that the tank assembly 222 includes a cover portion 241, covering the inner tank 224 and also covering the outer tank subassembly 246 (FIG. 5B). As can be seen in FIG. 5B, the cover portion 241 preferably is secured to, and at least partially supported by the outer perimeter wall 238 and the intermediate wall 242. In one embodiment, the cover portion 241 preferably includes one or more openings therein (not shown) through which the fluid 230 may be introduced into the inner tank 224 and also into the outer tank compartments 248.

It will be understood that the cover portion 241 and the fluid 230 are omitted from FIG. 5A, for clarity of illustration.

The first natural frequency is a first mode (i.e., a relatively lower frequency), and the second natural frequency is a second mode (i.e., a relatively higher frequency). It will be understood that the inner tank 224 is formed to receive the fluid 230 to the first depth 268, to dampen vibration of the tower structure 210 at the first natural frequency, which is the lower natural frequency. Similarly, the outer tank subassembly 246 is formed to receive the fluid 230 to the second depth 270, to dampen vibration of the tower structure 210 at the second natural frequency, which is the higher natural frequency.

Figure 5C:
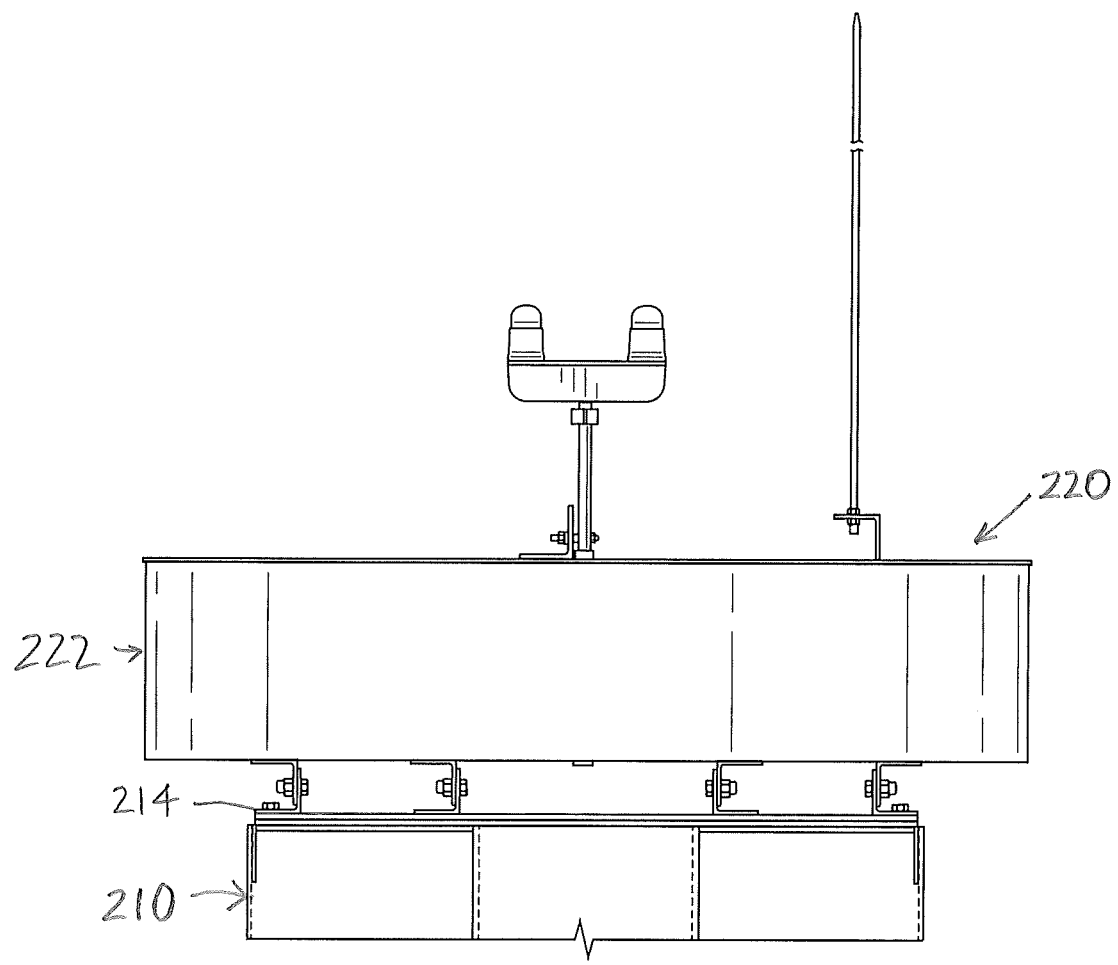
FIG. 5C is a side view of the system of FIGS. 5A and 5B mounted proximal to a top end of a tower structure, drawn at a smaller scale.
Figure 5D:
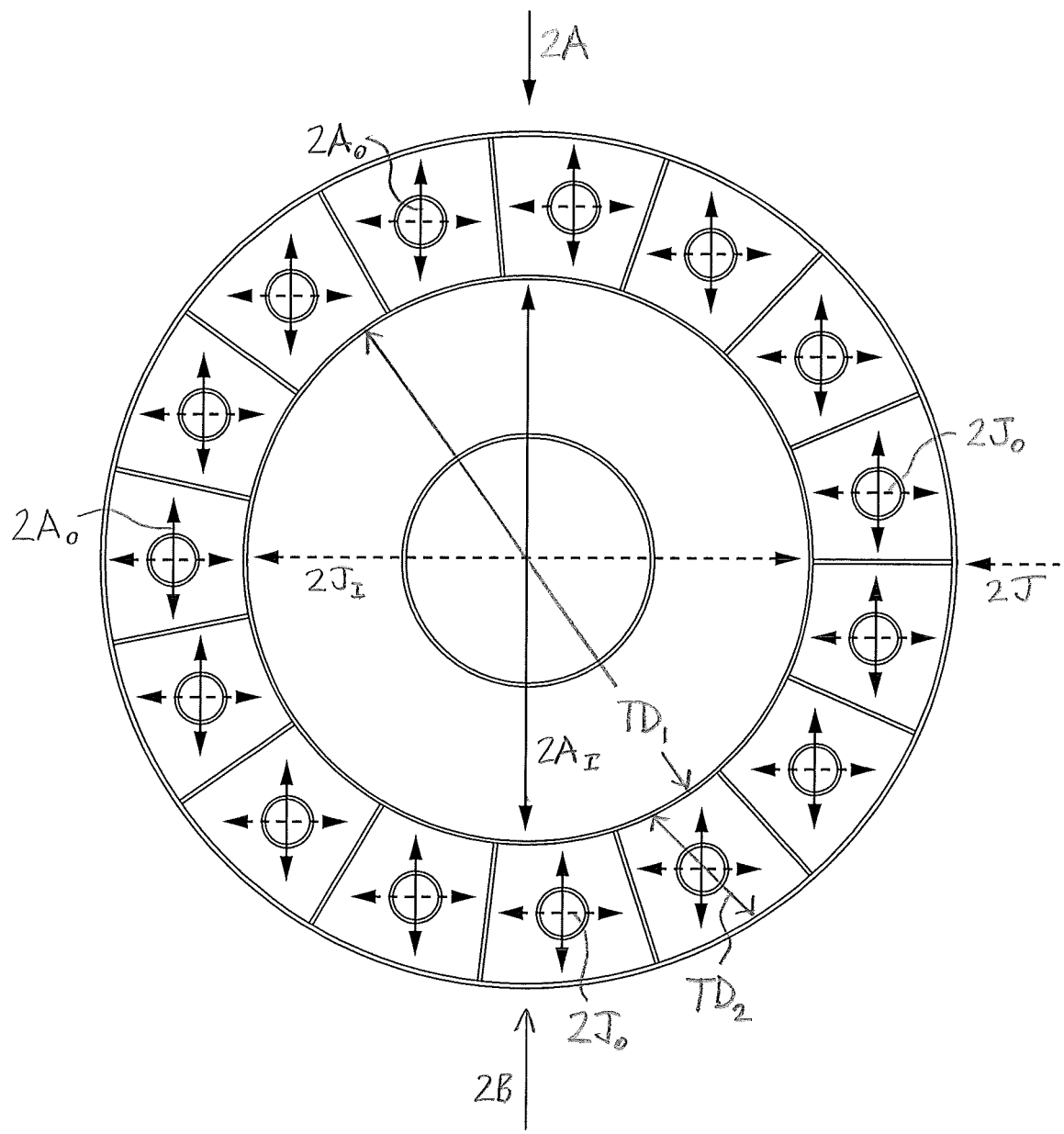
FIG. 5D is another top view of the system of FIG. 5A, drawn at a larger scale.

For the purposes hereof, the tower structure 210, and the tank assembly 222 secured to it, are collectively referred to as a structure "2S" (FIG. 5C). As can be seen in FIG. 5D, when the structure "2S" is pushed in the direction indicated by arrow "2A", the fluid 230 in the inner tank 224 moves correspondingly, as represented by the arrow "$2A_I$". Similarly, when the structure "2S" is pushed in the direction indicated by arrow "2J", the fluid 230 in the inner tank 224 moves accordingly, as indicated by arrow "$2J_I$". In FIG. 5D, it can be seen that the average travelling distance "$TD_1$" of the fluid 230 in the inner tank 224 is the same, regardless of the direction in which the structure "2S" is pushed.

However, because the tank compartments 248 are not circular in plan view, the travelling distance of the outer tank wave "$W_2$" in each respective outer tank compartment is approximately the same and may differ slightly, depending on the direction of movement of the fluid. For example, the movement of the fluid 230 in the outer tank compartment in response to the force applied to the structure "2S" in the direction indicated by arrow "2A" is represented by arrows "$2A_O$". The corresponding movement of the fluid 230 in the outer tank compartments 248 resulting from the force applied to the structure "2S" in the direction indicated by arrow "2J" is illustrated by arrows "$2J_O$". It can be seen in FIG. 5D that, depending on the radial position of a selected outer tank compartment relative to the direction of the force applied to the structure, the travelling distance of the fluid in the selected outer tank compartment is approximately the same and may vary slightly. For this reason, the average travelling distance "$TD_2$" is determined, to provide a travelling distance value for the outer tank compartment, for every direction of movement of the fluid, is approximately the travelling distance thereof. For exemplary purposes, "TD$_2$," is illustrated in FIG. 5D.

It will be understood that the system 220 may be located on the tower structure 210 at any suitable location. As can be seen in FIG. 5C, in one embodiment, it is preferred that the tank assembly 222 is configured to be located on the tower structure 210 proximal to the top end 214 of the tower structure 210. Locating the system 220 at the top end 214, or proximal thereto, permits the system 220 to have the greatest impact possible on the vibration of the tower structure 210. This is because, when the tower structure vibrates, the amplitude of such vibration is typically the greatest at the top end 214 of the tower structure 210.

It will also be understood that, when the system 220 is mounted on the tower structure 210, the tank assembly 222 is secured to the tower structure 210, by any suitable means.

For instance, if the structure "2S" is initially moved in a first direction indicated by arrow "2A" in FIG. 5D, then the fluid 230 in the inner tank 224 and in the outer tank compartments 248 moves in an opposite direction, opposite to the direction of travel of the structure, as indicated by the arrows "2A$_I$", "2A$_O$". As will be described, after moving as far as possible in the first direction, the structure moves in an opposite second direction, i.e., the structure vibrates. However, due to (i) the travelling distance "TD$_1$" and the depth 268 of the fluid 230 in the inner tank 224, and (ii) the average travelling distance "TD$_2$" and the second depth 270 of the fluid 230 in the outer tank compartments 248, the fluid 230 in the inner tank 224, and also the fluid 230 in all of the outer tank compartments 248, move at respective first and second fluid frequencies that are, respectively, the same as the first and second natural frequencies of the structure "2S". Accordingly, the sloshing movement of the fluid 230 in the inner tank 224 dampens the vibration at the first mode and the sloshing movement in all the outer tank compartments 248 dampens the second mode vibration of the tower structure 210.

It will be understood that the tank assembly 222, being secured to the tower structure 210, moves with the tower structure. However, it is believed that the fluid 230 begins to move in the opposite direction, so that its movement is out of phase relative to the movement of the structure "2S" in the first direction. Part of the damping effect of the system 220 may be attributed to the out of phase motion between the structure "2S" (i.e., the tower structure, and the tank assembly secured to it) and the fluid 230.

Those skilled in the art would appreciate that wind may cause a tower structure to vibrate. It will be understood that FIG. 5D is simplified, for clarity of illustration, and therefore does not fully show the structure "2S" vibrating.

In this example, after the structure "2S" is initially moved in a first direction indicated by arrow "2A", it then moves subsequently in a second direction indicated by arrow "2B" in FIG. 5D, i.e., the tower structure 210 is vibrating. However, when the tower structure 210 moves in the second direction and is oscillating in the first natural frequency, then the fluid 230 also moves in the inner tank 224, at the same frequency but in an opposite direction. Accordingly, the movement of the fluid 230 in the second direction also tends to dampen the vibration of the tower structure at the first natural frequency thereof.

Also, it is believed that, when the structure "2S" (i.e., the tower structure, and the tank assembly secured to it) moves, for example, in the direction indicated by arrow "2A" but oscillates in the second natural frequency, then the fluid 230 in the outer compartments 248 also moves, in the outer compartments 248, at the same frequency but in an opposite direction. Accordingly, the sloshing movement of the fluid 230 in the outer compartments 248 tends to dampen the vibration of the tower structure 210 at its second natural frequency.

Those skilled in the art would also appreciate that, when the structure "2S" vibrates, the shift between movement of the structure "2S" in the first direction to movement thereof in the second direction is relatively rapid. As noted above, the out of phase difference between the motion of the structure and that of the fluid 230 provides damping. Also, the vibration of the structure "2S" may persist for some time, with the dampening of such vibration causing a gradual decrease in the amplitude of the vibration until the vibration ceases.

From the foregoing, it can be seen that, while the structure "2S" vibrates, it is frequently changing its direction of travel. It is believed that is accompanied by the fluid changing its direction of travel at the same frequency as the structure "2S" oscillates over time, enhancing the damping effect of the system 220.

As noted above, the vibration of the structure "2S" may be initiated, for example, by wind. From FIGS. 5A and 5B, it can be seen that, advantageously, the inner tank 224 and the inner ring 256 are configured to respond generally in the same way to vibration of the structure "2S" that is initiated in any direction, due to the intermediate wall 242 and the ring 256 being circular in plan view.

It will be understood that the fluid depths 268, 270 may be any suitable depths. However, in one embodiment, the preselected inner ring height 259 is approximately 50 percent of the preselected first depth 268 of the fluid 230. It is also preferred that the preselected outer ring height 266 is approximately 50 percent of the preselected second depth 270 of the fluid 230 in each of the outer tank compartments 248.

It will be understood that the outer tank compartments 248 have smaller dimensions (i.e., as compared to the inner tank 224) to limit the distance the fluid can travel in each outer tank compartment 248 ("TD$_2$"), when the fluid oscillates due to movement of the tower structure 210. The size of each of the outer tank compartments is determined by the frequency (in this example, the second natural frequency) that is to be suppressed or attenuated.

Similarly, the travel distance "TD$_1$", i.e., the size of the inner tank 224, is determined by the frequency (in this case, the first natural frequency) that is to be suppressed or attenuated.

As can be seen in FIG. 5B, in one embodiment, the preselected second depth 270 of the fluid 230, and the preselected outer ring height 266 preferably are the same, or substantially the same, in each of the outer tank compartments 248 respectively.

The outer tank compartments 248 are the same size, and the preselected second depth 270 and the preselected outer ring height 266 are the same in each, so that the fluid in all of the outer tank compartments 248 collectively constitutes a relatively large mass of the fluid 230 that is movable at the second selected frequency.

It will be understood that the fluid positioned in the outer tank compartments 248 may not necessarily be the same as the fluid, which is located in the inner tank 224. However, as a practical matter, it is preferred that the same fluid 230 is located in the inner tank 224 and in the outer tank compartments 248. Those skilled in the art would appreciate that utilizing different fluids in the inner tank 224, on one hand, and in the outer tank compartments 248, on the other hand, may complicate somewhat the installation of the system, and the maintenance of the fluid at the preselected depths in the system.

The fluid 230 may be any suitable fluid. In one embodiment, the fluid 230 preferably includes a mixture of water and an anti-freeze liquid. For example, the anti-freeze liquid may be glycol.

The water and the anti-freeze liquid may be mixed together in any suitable proportions. For instance, in one embodiment, the fluid 230 preferably includes approximately 40 percent water by mass and approximately 60 percent anti-freeze liquid by mass. As noted above, the level of the fluid preferably is checked from time to time, in case of evaporation.

Those skilled in the art would appreciate that, depending on the circumstances, a tower structure may be subject to vibration at more than two natural frequencies. Multiple systems or combinations thereof can be used at different locations on the tower structure to address each of the susceptible (natural) frequencies.

Another alternative embodiment of the system 320 is illustrated in FIGS. 6A-6G. The system 320 is designed to dampen vibration of a tower structure 310 (FIG. 6E) at first and second natural frequencies thereof. It will be understood that the first natural frequency is a first mode (i.e., a relatively low frequency), the second natural frequency is a second mode (i.e., at a higher frequency, higher than the first natural frequency). The system 320 is designed to suppress or attenuate vibration of the structure at the two selected natural frequencies of the structure.

Figure 6A:
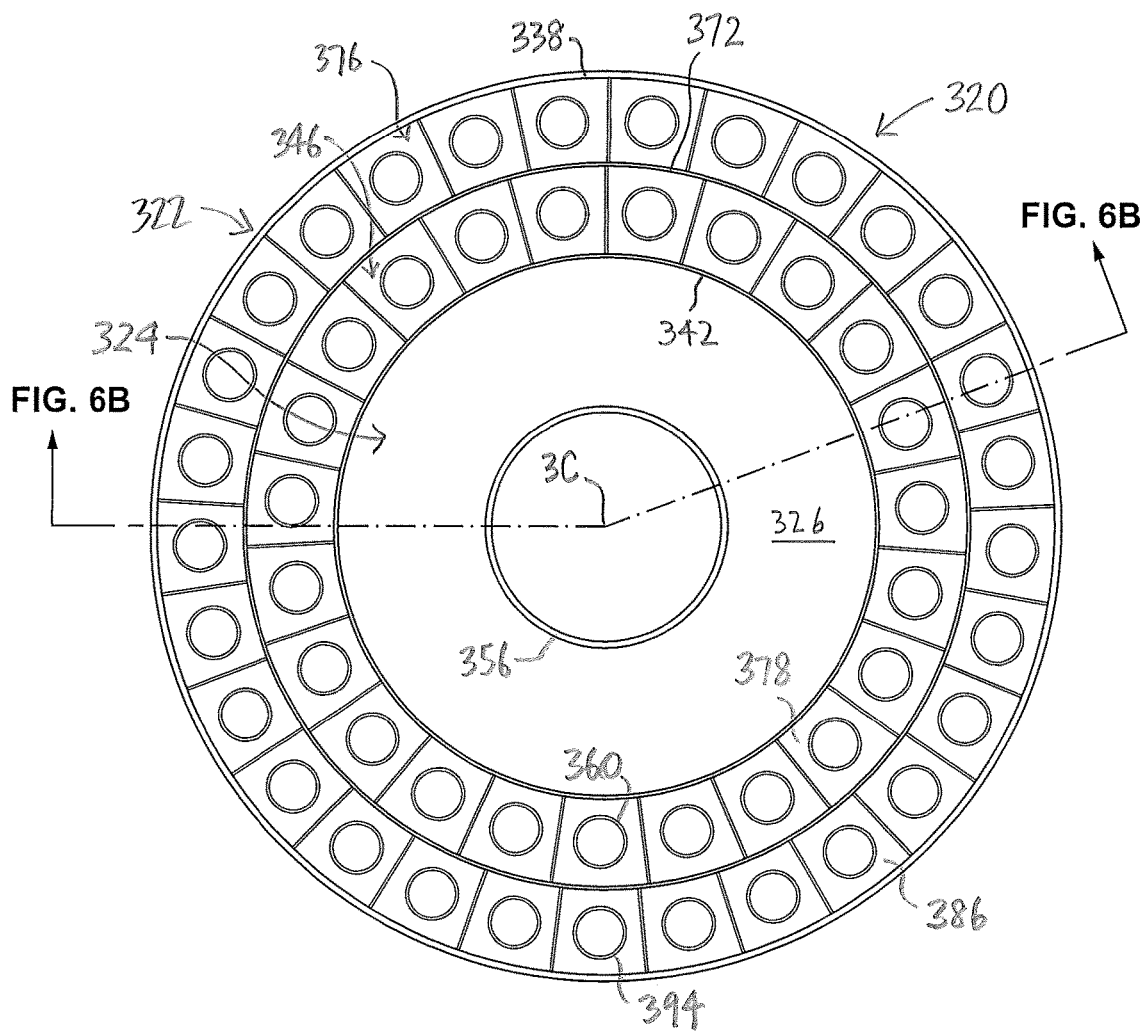
FIG. 6A is a top view of another alternative embodiment of the system of the invention, drawn at a larger scale.
Figure 6B:
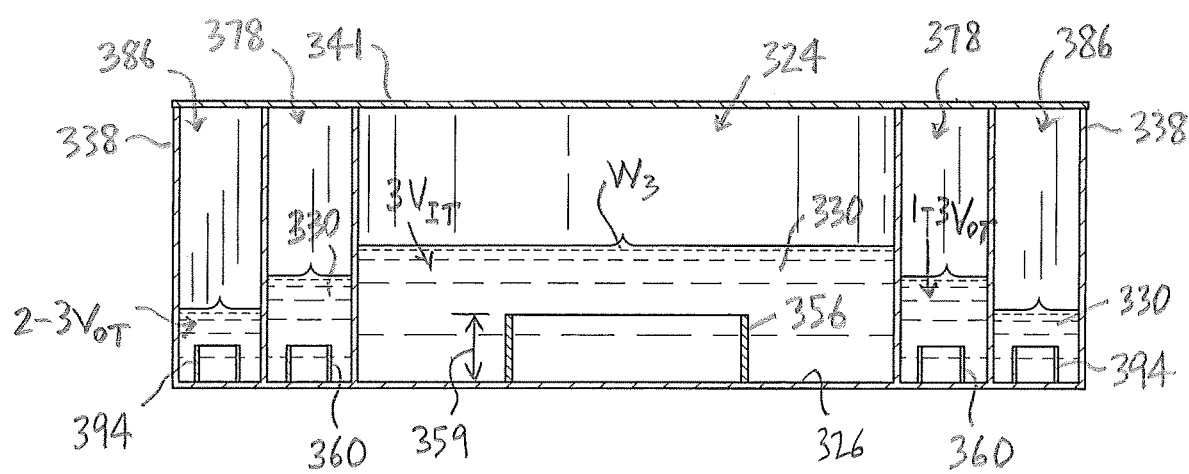
FIG. 6B is a cross-section of the system of FIG. 6A.
Figure 6C:
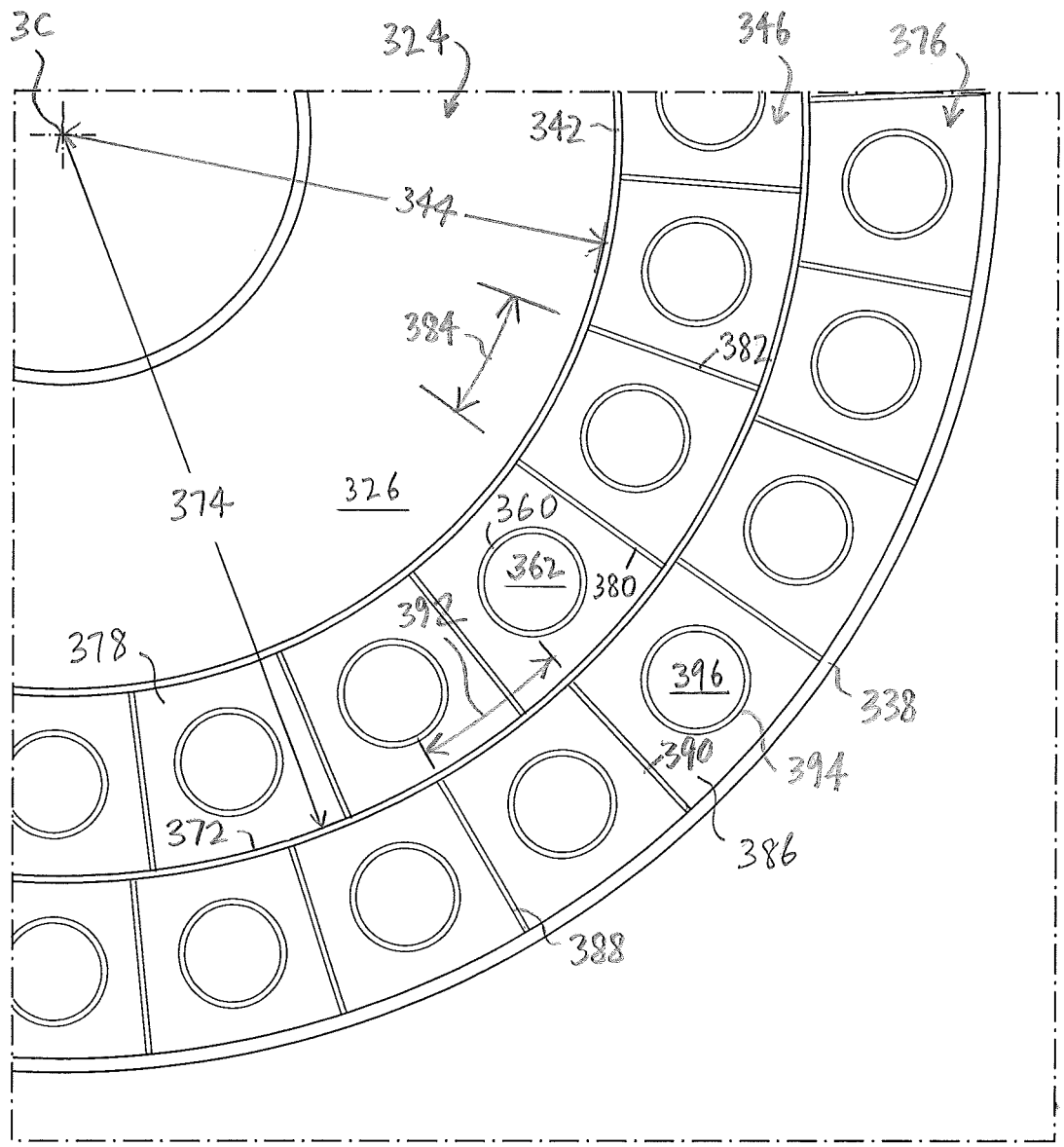
FIG. 6C is a portion of the top view of the system of FIG. 6A, drawn at a larger scale.

In one embodiment, the system 320 preferably includes a tank assembly 322 having a floor 326 and a circular first intermediate wall 342 having a first intermediate wall radius 344 centered on a center point "3C", and a circular second intermediate wall 372 having a second intermediate wall radius 374 centered on the center point "3C" (FIG. 6C). As can also be seen in FIG. 6A, the system 320 preferably also includes an outer perimeter wall 338 that is circular in plan view, and centered on the center point "3C".

In one embodiment, the tank assembly 322 preferably includes a first outer tank subassembly 346, positioned between the first intermediate wall 342 and the second intermediate wall 372, an inner tank 324 defined by the first intermediate wall 342, and a second outer tank subassembly 376, positioned between the second intermediate wall 372 and the outer perimeter wall 338.

As can be seen in FIGS. 6A and 6C, the first outer tank subassembly 346 preferably includes a number of first outer tank compartments 378. As illustrated in FIG. 6C, each of the first outer tank compartments 378 preferably is defined by first and second inner walls 380, 382 between the first and second intermediate walls that are radially aligned with the center point "3C" and spaced apart by a predetermined first radial distance 384, at the first intermediate wall.

It is also preferred that the second outer tank subassembly 376 includes a number of second outer tank compartments 386. Preferably, each of the second outer tank compartments 386 is defined by first and second outer walls 388, 390 between the second intermediate wall and the outer perimeter wall that are radially aligned with the center point "3C" and spaced apart by a predetermined second radial distance 392, at the second intermediate wall (FIG. 6C). Each of the second outer tank compartments 386 preferably is also defined by the outer perimeter wall 338 (FIG. 6C).

Figure 6D:
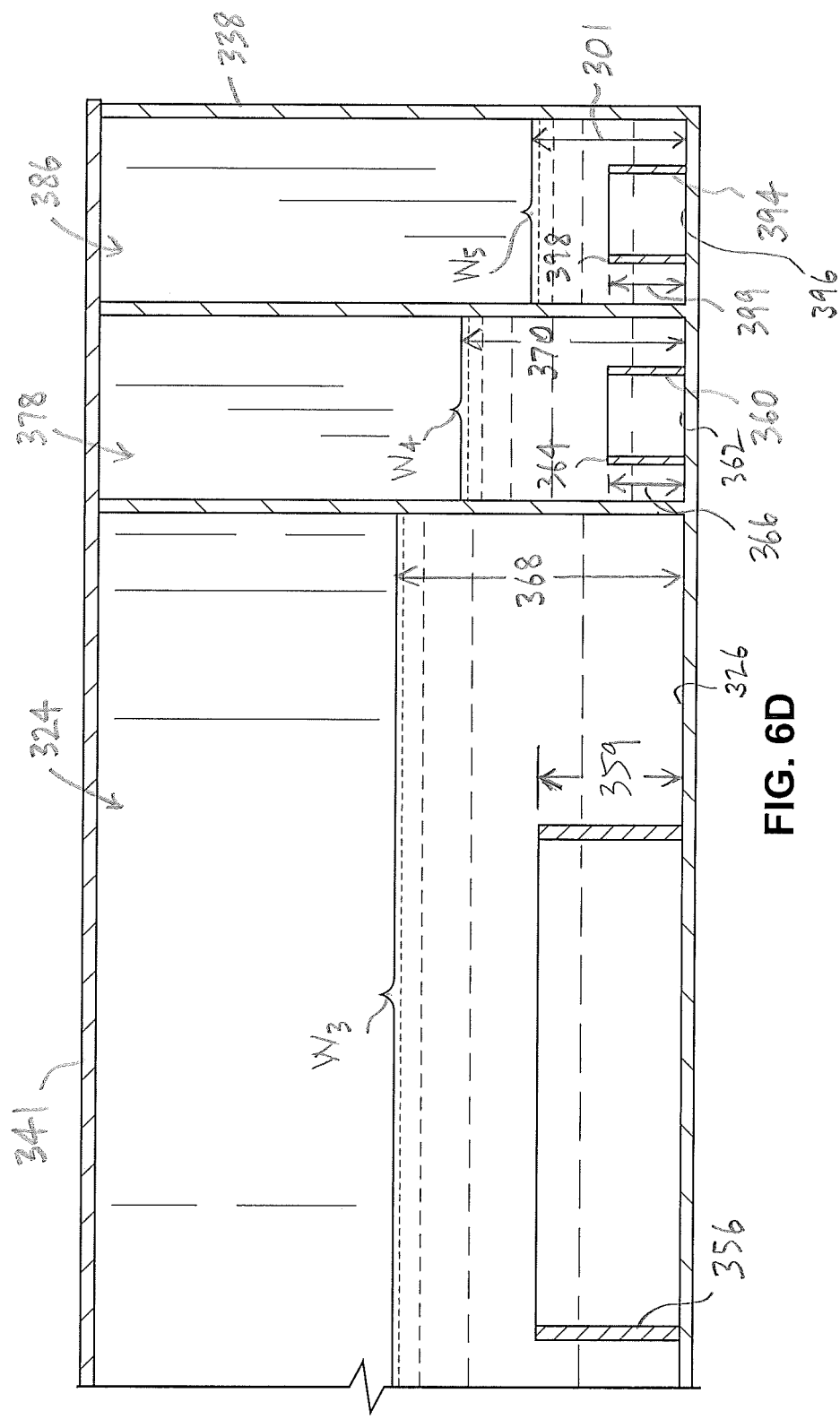
FIG. 6D is a portion of the cross-section of the system of FIG. 6B, drawn at a larger scale.

In one embodiment, the system 320 preferably includes an inner insert 356 centered on the center point "3C" of the tank assembly 322. The inner insert 356 preferably has an inner insert top edge 358 at a preselected inner insert height 359 above the floor 326 (FIG. 6D).

The system 320 preferably also includes a number of first outer inserts 360 and a number of second outer inserts 394. Each of the first outer inserts 360 preferably is centrally located in each of the first outer tank compartments 378 respectively on a first outer portion 362 of the floor 326 (FIG. 6C). As can be seen in FIG. 6D, each of the first outer inserts 360 preferably has a first outer insert top edge 364 at a preselected first outer insert height 366 above the first outer portion 362 of the floor 326.

Each of the second outer inserts 394 preferably is centrally located in each of the second outer tank compartments 386 respectively on second outer portions 396 of the floor 326 (FIG. 6C). Preferably, each of the second outer inserts 394 has a second outer insert top edge 398 at a preselected second outer insert height 399 above the second outer portion 396 of the floor 326 (FIG. 6D).

It will be understood that the respective dimensions of each of the first outer tank compartments 378, and the dimensions of the first outer rings 360 positioned therein respectively, preferably are substantially identical. The same fluid 330 preferably is positioned in each of the first outer tank compartments 378 to the same depth therein.

It will also be understood that the respective dimensions of the second outer tank compartments 386, and the dimensions of the second outer rings 394 positioned in each of the second outer tank compartments, preferably are substantially identical. Also, the same fluid 330 preferably is positioned in each of the second outer tank compartments 386 to the same depth therein.

As can be seen in FIGS. 6B and 6D, it is also preferred that the fluid 330 is located in the inner tank 324 to a preselected first depth 368 above the floor 326. The fluid 330 in the inner tank 324 occupies an inner tank volume identified in FIGS. 6B and 6D by reference character "$3V_{IT}$".

The first intermediate wall 342 preferably is formed to define an average inner tank travelling distance "$TD_3$" (FIG. 6F) of an inner tank wave "$W_3$" (FIG. 6B) through the fluid 330 in the inner tank 324. The preselected first depth 368 (FIG. 6D) preferably is greater than the inner insert height 359, to enable the inner tank wave "$W_3$" to move through the fluid 330 located in the inner tank 324 along the travelling distance "$TD_3$".

The fluid 330 preferably is also located in the first outer tank compartments 378, to a preselected first outer depth 370 therein above the first outer portion 362 of the floor 326. The fluid 330 in each of the first outer tank compartments 378 respectively occupies a first outer tank compartment volume "$1\text{-}3V_{OT}$".

Each of the first outer tank compartments 378 preferably is formed to define a first outer tank average travelling distance "$TD_4$" (FIG. 6G) of a first outer tank wave "$W_4$" (FIG. 6D) through the fluid 330 in each of the first outer tank compartments 378 respectively. The preselected first outer depth 370 preferably is greater than the first outer insert height 366, to enable the first outer tank wave "$W_4$" to move through the fluid 330 respectively located in the first outer tank compartments 378 along the travelling distance "$TD_4$" (FIG. 6D).

Preferably, the fluid 330 is also located in the second outer tank compartments 386, to a preselected second outer depth 301 therein above the second outer portion 396 of the floor 326. The fluid 330 in each of the second outer tank compartments 386 respectively occupies a second outer tank compartment volume "$2\text{-}3V_{OT}$".

It is also preferred that each of the second outer tank compartments 386 is formed to define a second outer tank average travelling distance "TD$_5$" (FIG. 6G) of a second outer tank wave "W$_5$" (FIG. 6D) through the fluid 330 in each of the second outer tank compartments 386 respectively. The preselected second outer depth 301 preferably is greater than the second outer insert height 399, to enable the second outer tank wave "W$_5$" to move through the fluid 330 respectively located in the second outer tank compartments 386 along the travelling distance "TD$_5$" (FIG. 6D).

Preferably, the preselected first depth 368 of the fluid 330 and the average travelling distance "TD$_3$" are selected so that fluid in the inner tank volume "3V$_{IT}$" is movable at the first natural frequency. The movement of the fluid in the inner tank 324 is out of phase with the vibration of the tower structure 310 at the first natural frequency, to dampen vibration of the tower structure 310 at the first natural frequency.

It is also preferred that the preselected first outer depth 370 of the fluid 330 and the average travelling distance "TD$_4$" are selected so that the fluid in all of the first outer tank compartments (i.e., the sum thereof) is movable at the second natural frequency. The movement of the fluid in the first outer tank compartments is out of phase with the vibration of the tower structure 310 at a second natural frequency, to dampen vibration of the tower structure 310 at the second natural frequency.

Preferably, the preselected second outer depth 301 of the fluid 330 and the average travelling distance "TD$_5$" are selected so that the fluid in all of the second outer tank compartments (i.e., the sum thereof) is movable at the second natural frequency. The movement of the fluid in the second outer tank compartments is out of phase with the vibration of the tower structure 310 at the second natural frequency, to dampen vibration of the tower structure 310 at the second natural frequency.

Preferably, the tank assembly 322 includes a cover portion 341 that covers the inner tank 324, the first outer tank compartments 378, and the second outer tank compartments 386 (FIGS. 6B, 6D). As can be seen in FIGS. 6B and 6D, the cover portion 341 preferably is secured to, and supported by, the outer perimeter wall 338, the first intermediate wall 342, and the second intermediate wall 372. In one embodiment, the cover portion 341 preferably includes one or more openings (not shown) through which the fluid 330 may be introduced into the inner tank 324, the first outer tank compartments 378, and the second outer tank compartments 386. It will be understood that, for clarity of illustration, the cover portion 341 and the fluid 330 are omitted from FIGS. 6A, 6C, 6F, and 6G.

The system 320 may be located on the tower structure 310 at any suitable location. It is preferred that the tank assembly 322 is configured to be located on the tower structure 310 proximal to a top end 314 of the tower structure 310. Locating the system 320 at the top end 314, or proximal thereto, permits the system 320 to have the greatest possible impact on the vibration of the tower structure 310.

Figure 6E:
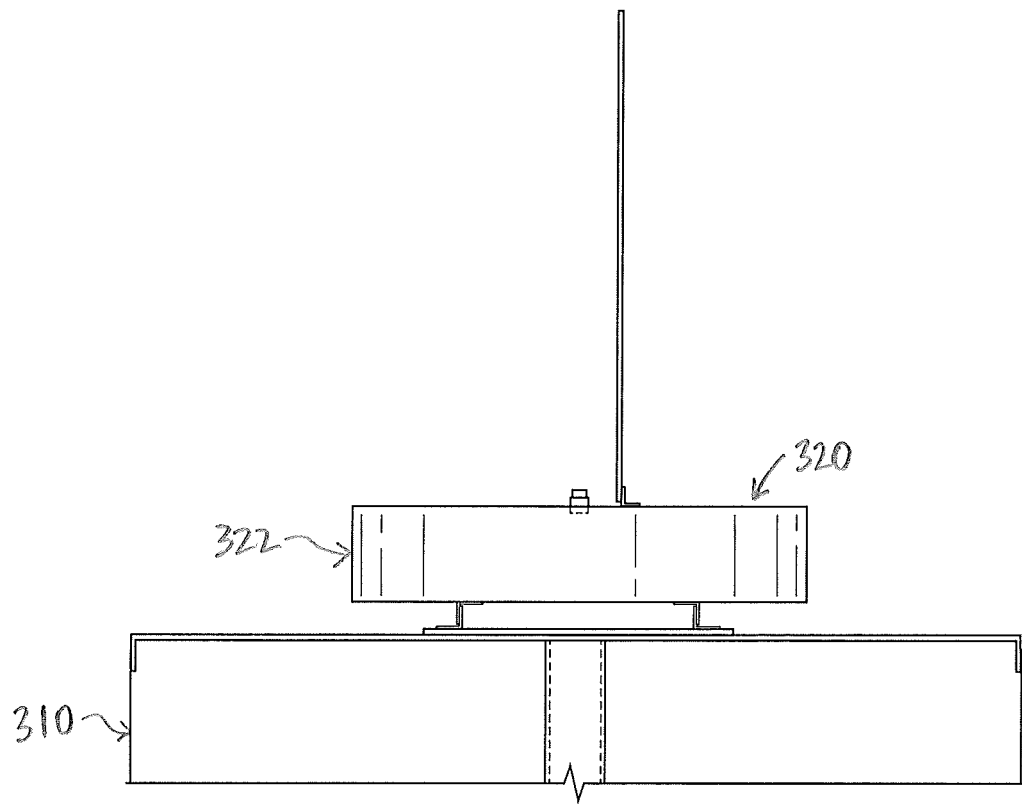
FIG. 6E is a side view of the system of FIGS. 6A-6C mounted proximal to the top end of a tower structure, drawn at a smaller scale.

It will be understood that, when the system 320 is mounted on the tower structure 310, the tank assembly 322 is secured to the tower structure 310 by any suitable means. For the purposes hereof, the tower structure 310, and the tank assembly 322 secured to it, are collectively referred to as a structure "3S" for convenience (FIG. 6E).

The system 320 (FIGS. 6A-6D) is an alternative embodiment, similar to the system 220 (FIGS. 5A-5D), except that the two outer tank subassemblies 346, 376 are required to suppress the second mode of vibration motion of the tower structure, unlike the single outer tank subassembly 246. In this way, the two outer rows of tank compartments (i.e., in subassemblies 346 and 378) could be the to functionally correspond to the single outer row of tank compartments in the system 220.

Figure 6F:
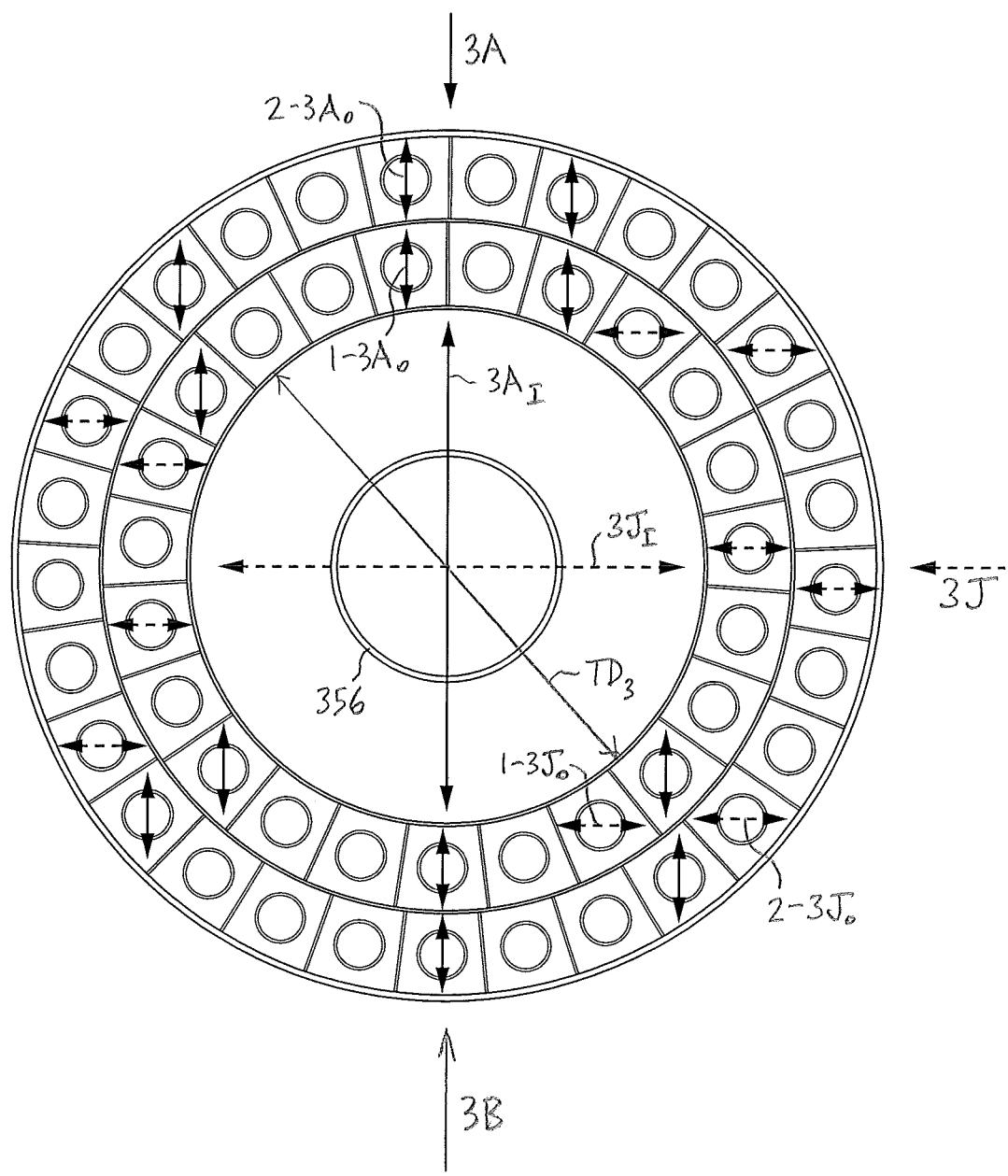
FIG. 6F is another top view of the system of FIG. 6A, drawn at a larger scale.
Figure 6G:
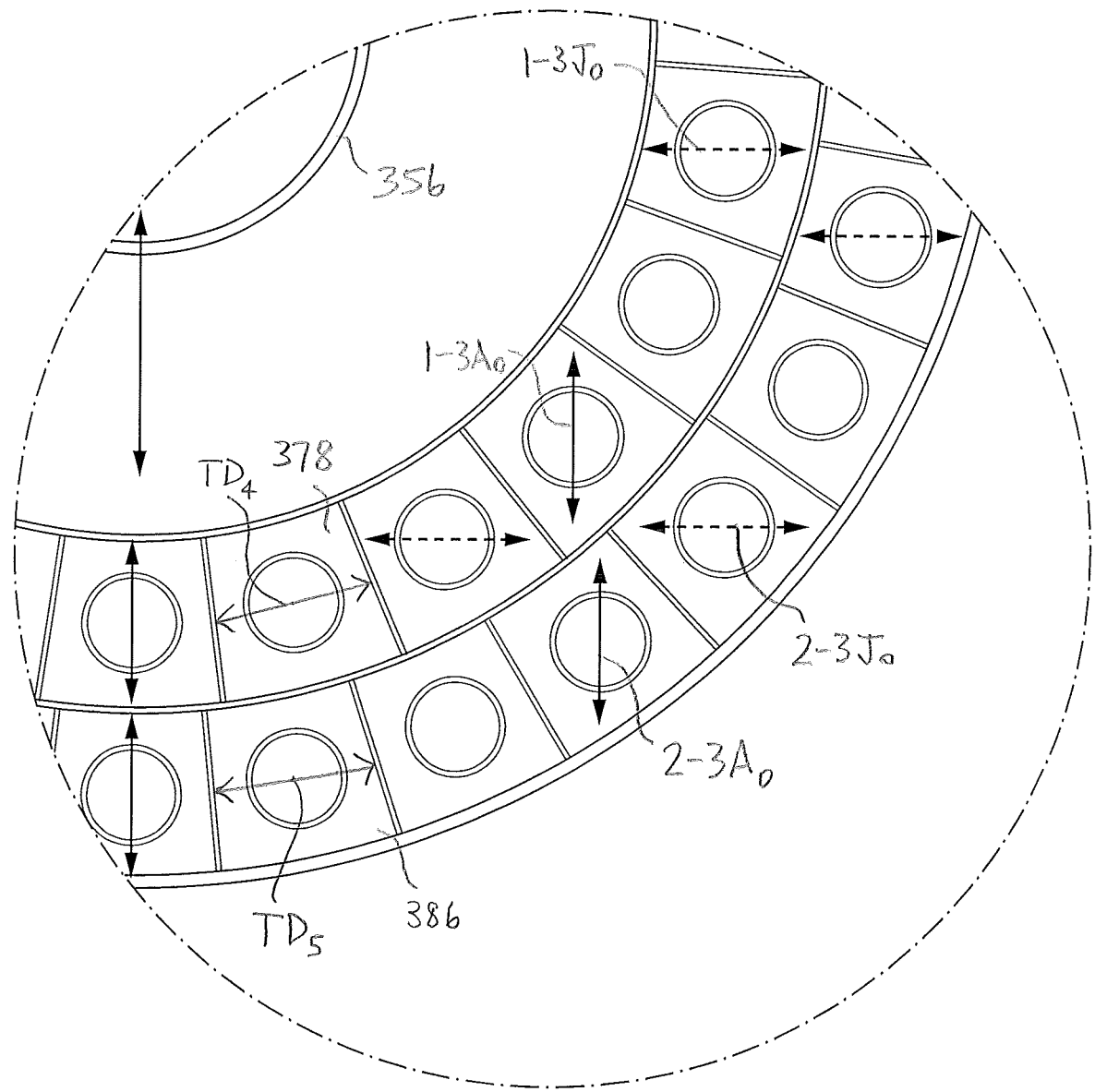
FIG. 6G is a portion of the top view of the system of FIG. 6F, drawn at a larger scale.

For instance, if the structure "3S" is initially moved in a first direction indicated by arrow "3A" in FIG. 6F, then the fluid 330 is moved in a direction opposite to the first direction. The structure also moves in an opposite second direction, i.e., the structure vibrates. However, due to the travelling distance "TD$_3$" and the depth 368 of the fluid 330 in the inner tank, the fluid 330 in the inner tank 324 moves in the direction opposite to the direction of travel of the structure at a frequency that is the same as (or substantially the same as) the first natural frequency of the structure.

Similarly, due to the average travelling distance "TD$_4$" and the depth 370 of the average fluid 330 in the first outer compartments 378, and the average travelling distance "TD$_5$" and the depth 301 of the fluid in the second outer tank compartments 386, the fluid 330 in all of the first outer tank compartments 378, and the fluid 330 in all of the second outer tank compartments 386, moves in the direction opposite to the direction of travel of the structure at a frequency that is the same as the second natural frequency of the structure.

Accordingly, the movement of the fluid 330 in the inner tank 324 and in all the outer tank compartments 378, and in all of the second outer tank compartments 386, in response to movement of the tower structure 310 dampens vibration of the structure "3S".

As can be seen in FIG. 6F, when the structure "3S" is pushed in the direction indicated by arrow "3A", the fluid 330 in the inner tank 324 moves correspondingly, as represented by the arrow "3A$_1$". Similarly, when the structure 3S is pushed in the direction indicated by arrow "3J", the fluid in the inner tank 324 moves accordingly, as indicated by arrow "3J$_1$". In FIG. 6F, it can be seen that the average travelling distance "TD$_3$" of the fluid 330 in the inner tank 324 is the same, regardless of the direction in which the structure "3S" is pushed.

As can be seen in FIG. 6F, neither the first outer tank compartments 378 nor the second outer tank compartments 386 are circular in plan view. Accordingly, the travelling distance of the first inner tank wave "W$_4$" in each respective first outer tank compartment 378 is approximately the same but may differ slightly, depending on the direction of movement of the fluid. For example, the movement of the fluid in the first outer tank compartment 378 in response to the force represented by arrow "3A" is represented by arrows "1-3A$_O$". The corresponding movement of the fluid in the first outer tank compartments 378 resulting from the force represented by arrow "3J" is illustrated by arrows "1-3J$_O$". It can be seen in FIG. 6F that, depending on the radial position of a selected first outer tank compartment relative to the direction of the force applied to the structure "3S", the travelling distance of the fluid in the selected first outer tank compartment may vary.

The travelling distance of the first inner tank wave "W$_5$" in each respective second outer tank compartment 386 is approximately the same but may differ slightly, depending on the direction of movement of the fluid. For example, the movement of the fluid in the second outer tank compartment in response to the force represented by arrow "3A" is represented by arrows "2-3A$_O$". The corresponding movement of the fluid in the second outer tank compartments 386 resulting from the force represented by arrow "3J" is illustrated by arrows "2-3J$_O$". It can be seen in FIG. 6F that, depending on the radial position of a selected second outer tank compartment 386 relative to the direction of the force applied to the structure, the travelling distance of the fluid in the selected second outer tank compartment 386 may vary.

Because neither the first outer tank compartments 378 nor the second outer tank compartments 386 are circular, the respective travelling distances therein, "$TD_4$" and "$TD_5$" respectively, are average travelling distances. That is, each of the average travelling distances is an arithmetic average of the possible travelling distances in an outer tank compartment.

It will be understood that the tank assembly 322, being secured to the tower structure 310, moves with the tower structure 310. However, it is believed that the fluid 330 commences moving in the direction opposite to the direction in which the structure "3S" moves at the same time as the structure "3S" moves. The fluid 330 moves in the direction opposite to the first direction, so that its movement is out of phase relative to the movement of the tower structure 310 in the first direction (indicated by arrow "3A"). Part of the damping effect of the system 320 may be attributed to the out of phase motion with respect to the structure "3S" (i.e., the tower structure, and the tank assembly secured to it).

In this example, if the tower structure 310 is initially moved in the first direction (represented by arrow "3A"), then the structure moves subsequently in a second direction indicated by arrow "3B" in FIG. 6F, i.e., the tower structure 310 vibrates. However, when the tower structure 310 moves in the second direction, then the fluid 330 also moves in the second direction (i.e., in the inner tank 324, in all of the first outer compartments 378, and in all of the second outer compartments 386), but at a frequency in each respectively that is the same as the first and second natural frequencies respectively. Accordingly, the movement of the fluid 330 in the second direction also tends to dampen the vibration of the tower structure 310 at the first and second natural frequencies thereof.

Also, it is believed that, when the structure "3S" (i.e., the tower structure, and the tank assembly secured to it) moves, for example, in the direction indicated by arrow "3A" but oscillates in the second natural frequency, then the fluid 330 in the first and second outer tank compartments 378, 386 also moves, in such tank compartments, at the same frequency but in an opposite direction. Accordingly, the sloshing movement of the fluid 330 in the outer compartments 378, 386 tends to dampen the vibration of the tower structure 310 at its second natural frequency.

Those skilled in the art would also appreciate that, when the tower structure vibrates, the shift between movement of the structure "3S" in the first direction to movement thereof in the second direction is relatively rapid. As noted above, the out of phase difference between the motion of the structure "3S" and that of the fluid 330 provides damping. Also, the vibration of the structure "3S" may persist for some time, with the dampening of such vibration causing a gradual decrease in the amplitude of the vibration until the vibration ceases.

From the foregoing, it can be seen that, while the structure "3S" vibrates, it is frequently changing its direction of travel. It is believed that is accompanied by the fluid changing its direction of travel at the same selected two frequencies as the structure "3S" over time, enhancing the damping effect of the system 320.

It will be understood that the fluid depths 368, 370, 301 may be any suitable depths. However, in one embodiment, the preselected inner ring height 359 is approximately 50 percent of the preselected first depth 368 of the fluid 330. As illustrated, the preselected first outer ring height 366 is somewhat less than approximately 50 percent of the preselected first outer depth 370 of the fluid 330 in each of the first outer tank compartments 328. Preferably, the preselected second outer ring height 399 is approximately 50 percent of the preselected second outer depth 301 of the fluid 330 in each of the second outer tank compartments 386.

It will be understood that the first and second outer tank compartments 378, 386 have smaller dimensions (i.e., as compared to the inner tank 324) to limit the distance the fluid can travel in each compartment 378, 386, when the fluid 330 oscillates due to movement of the tower structure 310. The size of each of the first and second outer tank compartments (i.e., the average travelling distances "$TD_4$", "$TD_5$" is determined by the frequency (in this example, the second natural frequency) that is to be suppressed or attenuated.

Similarly, the size of the inner tank 324 (i.e., the travelling distance "$TD_3$") is determined by the frequency (in this case, the first natural frequency) that is to be suppressed or attenuated.

As can be seen in FIGS. 6B and 6D, in one embodiment, the preselected first outer depth 370 of the fluid 330 and the preselected first outer ring height 366 preferably are the same, or substantially the same, in each of the first outer tank compartments 378.

The first outer tank compartments 378 preferably are each the same size, and the preselected first outer depth 370 and the preselected first outer ring height 366 preferably are the same in each, so that the fluid in all the first outer compartments 378 may collectively constitute a relatively large mass of the fluid 330 that is movable at the second natural frequency.

It is also preferred that the second outer depth 301 of the fluid 330 and the preselected second outer ring height 399 are the same, or substantially the same, in each of the second outer tank compartments 386.

As an example, the first outer depth 370 is shown as being greater than the second outer depth 301. It will be understood that the depths 370, 301 may be any suitable depths.

The second outer compartments 386 preferably are each the same size, and the second outer depth 301 and the preselected second outer ring height 399 preferably are the same in each, so that the fluid 330 in all the second outer compartments 386 may collectively constitute a relatively large mass of the fluid 330 that is also movable at the second natural frequency.

It will be understood that the fluid positioned in the first and second outer tank compartments 378, 386 may not necessarily be the same as the fluid which is located in the inner tank 324. Similarly, different fluids (i.e., different from each other) may be positioned in the first and second outer compartments respectively. However, as a practical matter, it is preferred that the same fluid 330 is located in the inner tank 324 and in the first and second outer tank compartments 378, 386. Those skilled in the art would appreciate that utilizing different fluids in the inner tank 324 and in the first and second outer tank compartments 378, 386 may complicate somewhat the design and installation of the system, and the maintenance of the fluid at the preselected depths in the system.

The fluid 330 may be any suitable fluid. In one embodiment, the fluid 330 preferably includes a mixture of water and an anti-freeze liquid. For example, the anti-freeze liquid may be glycol.

The water and the anti-freeze liquid may be mixed together in any suitable proportions. For instance, in one embodiment, the fluid 330 preferably includes approximately 40 percent water by mass and approximately 60 percent anti-freeze liquid by mass.

Another alternative embodiment of the system 420 of the invention is illustrated in FIGS. 4A-4D. Preferably, the system 420 is designed to dampen vibration of a tower structure 410 (FIG. 4C) that is subject to vibration at a single, relatively high natural frequency. The system 420 is designed to suppress or attenuate vibration of the tower structure 410 at the selected natural frequency of the structure.

In one embodiment, the system 420 preferably includes a tank assembly 422 having a floor 426 and a circular intermediate wall 442 having an intermediate wall radius 444 centered on a center point "4C". The system 420 preferably also includes an outer tank subassembly 446 positioned between the intermediate wall and an outer perimeter wall 438. It is also preferred that the outer tank subassembly 446 preferably includes a number of outer tank compartments 448.

Figure 4A:
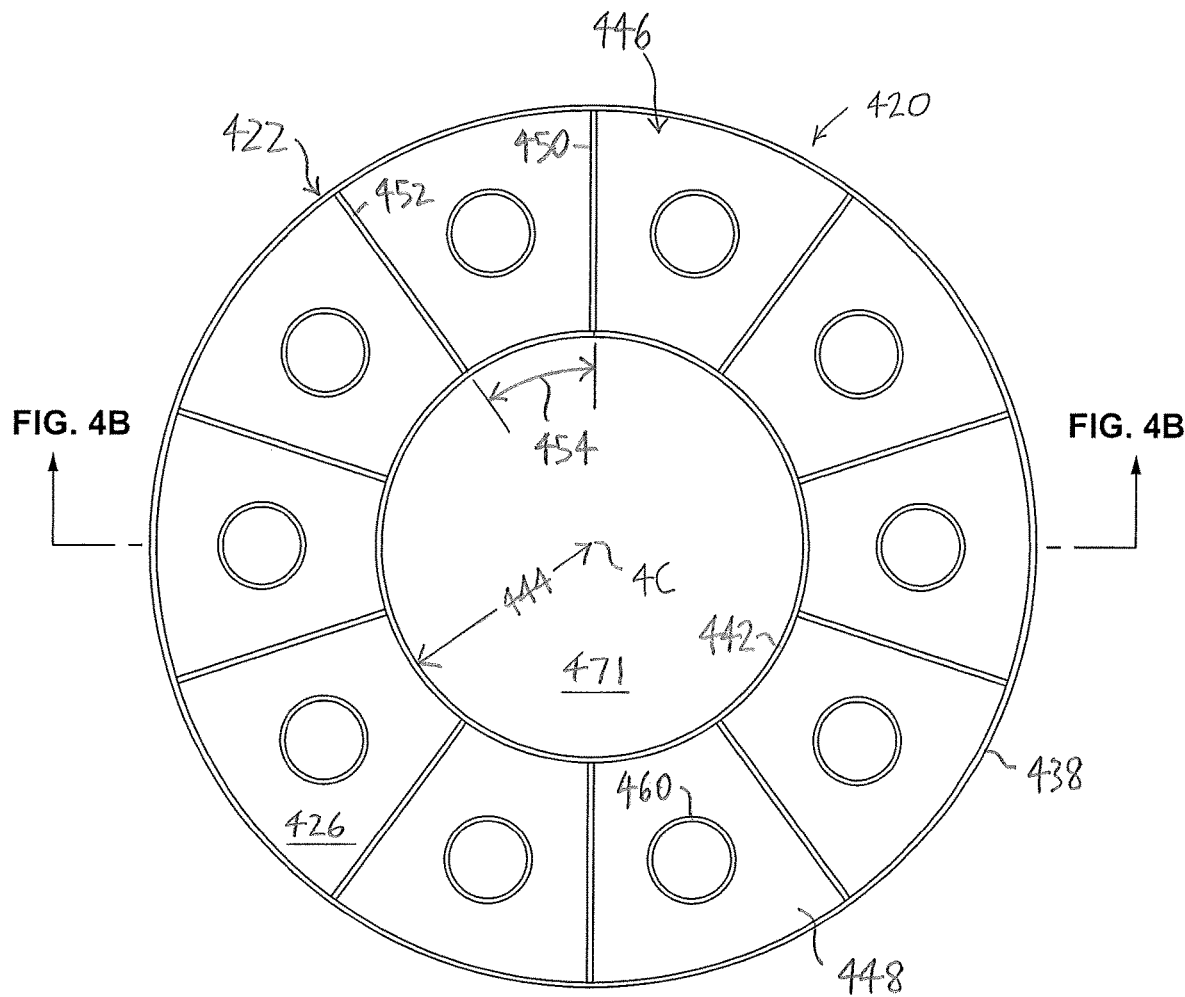
FIG. 4A is a top view of an alternative embodiment of the system of the invention, drawn at a larger scale.

As can be seen in FIG. 4A, each of the outer tank compartments 448 preferably is defined by first and second walls 450, 452 between the intermediate wall and the outer perimeter wall that are radially aligned with the center point spaced apart by a predetermined radial distance 454 at the intermediate wall 442. Preferably, the system 420 also includes a number of inserts 460, each of the inserts 460 being located in each of the outer tank compartments 448 respectively. Each of the inserts 460 has a top edge 434 at a preselected height 466 above the floor 426 (FIG. 4B).

It is also preferred that the system 420 includes a fluid 430 that is located in each of the outer tank compartments 448 to a preselected outer tank depth 470. The fluid 430 in each outer tank compartment 448 occupies an outer tank compartment volume "$4V_{OT}$".

Figure 4B:
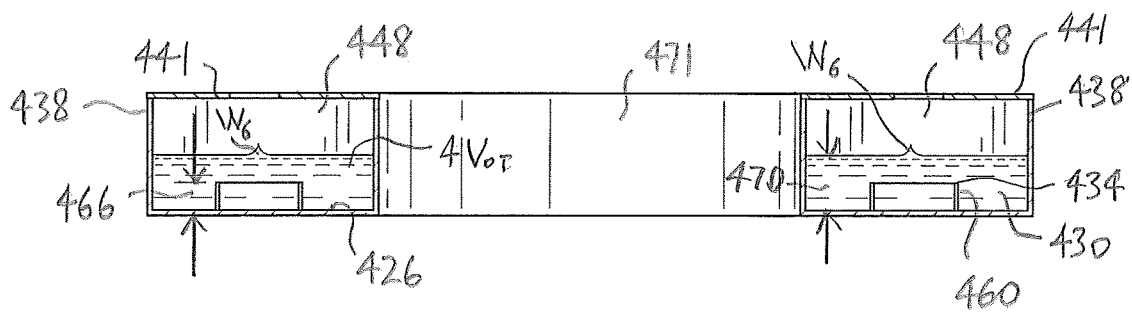
FIG. 4B is a cross-section of the system of FIG. 4A.
Figure 4C:
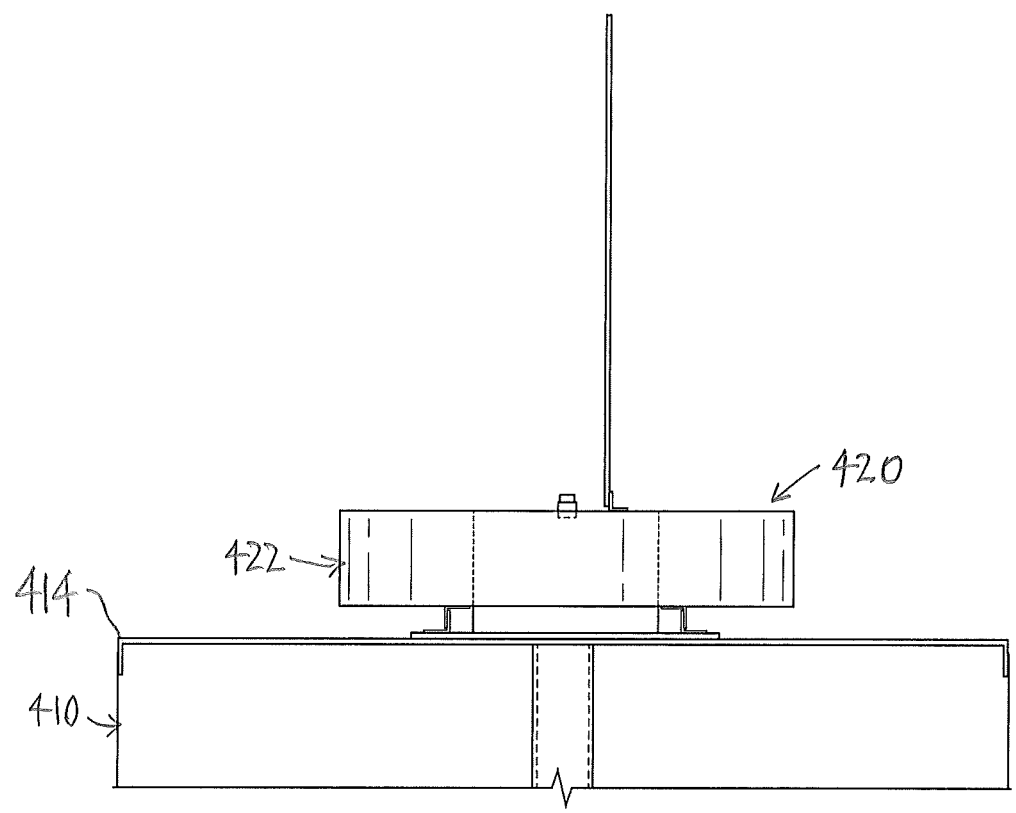
FIG. 4C is a side view of the system of FIGS. 4A and 4B mounted proximal to a top end of a tower structure, drawn at a smaller scale.
Figure 4D:
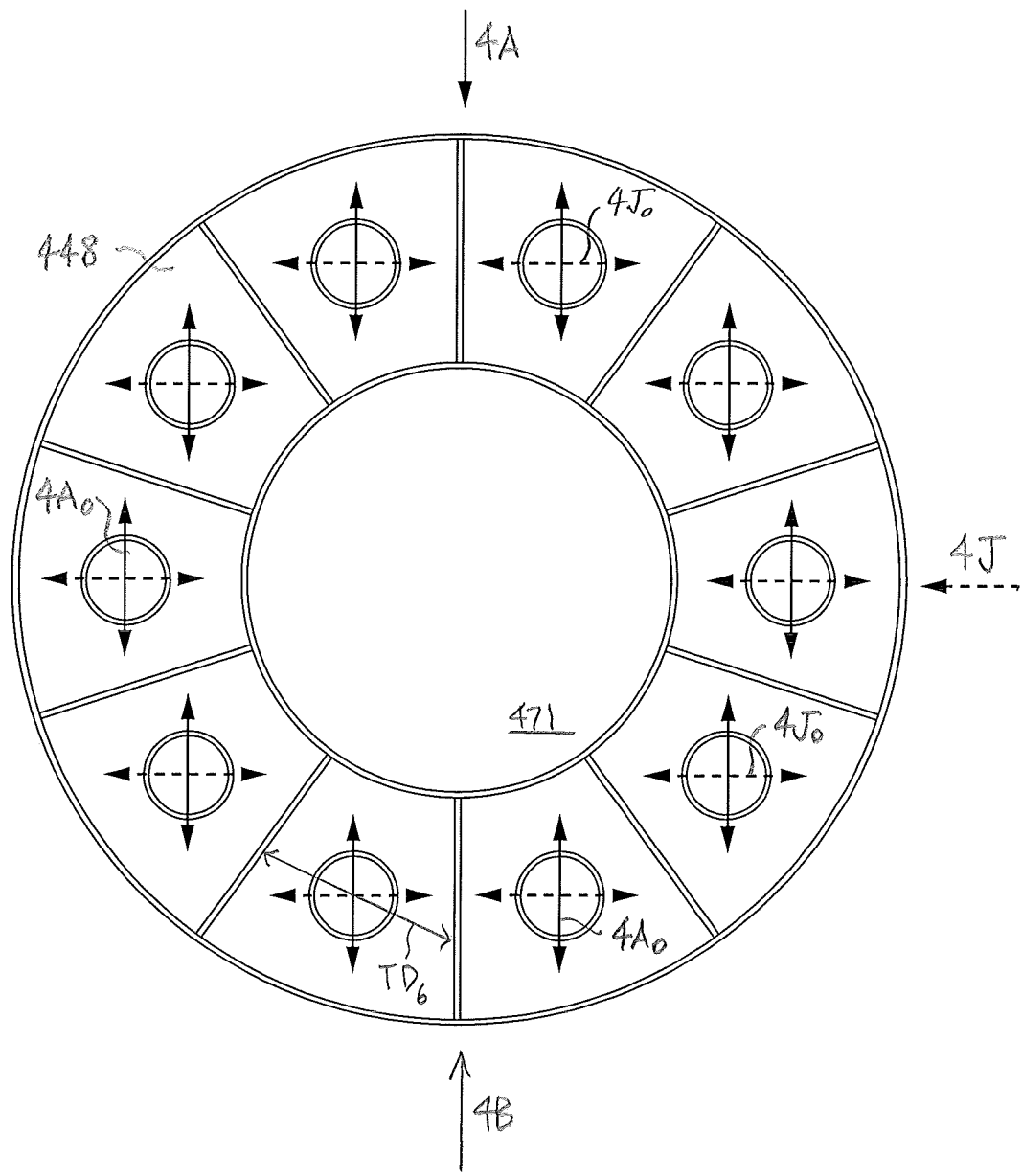
FIG. 4D is another top view of the system of FIG. 4A, drawn at a larger scale.

As can be seen in FIGS. 4A, 4B, and 4D, the intermediate wall 442 defines a central opening 471 in the tank assembly 422.

It is also preferred that the tank assembly 422 includes a cover portion 441, covering the outer tank subassembly 446 (FIG. 4B). As can be seen in FIG. 4B, the cover portion 441 preferably is secured to, and at least partially supported by, the outer perimeter wall 438 and the intermediate wall 442. In one embodiment, the cover portion 441 preferably includes one or more openings therein (not shown) through which the fluid 430 may be introduced into the outer tank compartments 448.

It will be understood that the cover portion 441 and the fluid 430 are omitted from FIG. 4A, for clarity of illustration.

Preferably, each of the outer tank compartments 448 is formed to define an average outer tank travelling distance "$TD_6$" of an outer tank compartment wave "$W_6$" through the fluid 430 in each of the outer tank compartments 448 respectively (FIG. 4D).

The preselected outer tank depth 470 preferably is greater than the preselected height 466, to enable the outer tank compartment wave "$W_6$" to move through the fluid 430 located in each of the outer tank compartments 448 respectively.

The preselected depth 470 of the fluid 430 and the average travelling distance "$TD_6$" preferably are selected so that the fluid 430 constituting the total of the outer tank compartment volumes "$4V_{OT}$" is movable at a frequency that is the same as a natural frequency of vibration of the tower structure that is to be suppressed or attenuated, to dampen the vibration of the tower structure.

The system 420 may be located on the tower structure 410 at any suitable location. As can be seen in FIG. 4C, in one embodiment, it is preferred that the tank assembly 422 is configured to be located on the tower structure 410 proximal to a top end 414 of the tower structure 410. Locating the system 420 at the top end 414, or proximal thereto, permits the system 420 to have the greatest impact possible on the vibration of the tower structure. This is because, when the tower structure vibrates, the amplitude of such vibration is typically the greatest at the top end 414 of the tower structure 410.

It will be understood that, when the system 420 is mounted on the tower structure 410, the tank assembly 422 is secured to the tower structure 410, by any suitable means. For the purposes hereof, the tower structure 410, and the tank assembly 422 secured to it, are collectively referred to as a structure "4S", for convenience (FIG. 4C).

The travelling distance of the outer tank compartment wave "$W_6$" in each respective outer tank compartment 448 is approximately the same and may differ slightly, depending on the direction of movement of the fluid. Because of this, the travelling distance "$TD_6$" is an average of the travelling distances inside the outer tank compartment 448. For example, the movement of the fluid in the outer tank compartment in response to the force represented by arrow "4A" is represented by arrows "$4A_O$". The corresponding movement resulting from the force represented by arrow "4J" is illustrated by arrows "$4J_O$". It can be seen in FIG. 4D that, depending on the radial position of a selected outer tank compartment relative to the direction of the force applied to the structure, the travelling distance of the fluid in the selected first outer tank compartment is approximately the same.

For instance, if the structure "4S" is initially moved in a first direction indicated by arrow "4A" in FIG. 4D, then the fluid 430 is moved in the same direction. However, due to the average travelling distance "$TD_6$" and the outer tank depth 470 of the fluid 430, the fluid 430 in all of the outer tank compartments 448, moves at respective a fluid frequency that is slightly different from the natural frequency. Accordingly, the movement of the fluid 430 in all the outer tank compartments 448, in response to movement of the tower structure 410 at the natural frequency thereof, dampens such vibration of the tower structure 410.

It will be understood that the tank assembly 422, being secured to the tower structure 410, moves with the tower structure. However, it is believed that the fluid 430 commences moving in an opposite direction to the first direction at exactly the same time as the structure "4S" begins to move. Instead, the wave "$W_6$" of the fluid 430 begins to move in the opposite direction, so that the fluid wave "$W_6$" movement is out of phase relative to the movement of the tower structure in the first direction. Part of the damping effect of the system 420 may be attributed to the out of phase motion with respect to the structure "4S" (i.e., the tower structure, and the tank assembly secured to it).

In this example, after the structure "4S" is initially moved in the first direction "4A" (FIG. 4D), it then moves subsequently (reversing its motion) in a second direction indicated by arrow "4B" in FIG. 4D, i.e., the tower structure 410 is vibrating. However, when the tower structure 410 moves in a direction opposite to the second direction, then the fluid 430 also moves in the second direction, in all of the outer compartments 448. Accordingly, the movement of the fluid 430 in the second direction also tends to dampen the vibration of the tower structure at the natural frequencies.

Also, it is believed that, when the structure "4S" (i.e., the tower structure, and the tank assembly secured to it) changes its direction of travel (i.e., from the first direction to the second direction), the fluid 430 is still moving in the first direction. Once again, there is an out of phase difference between the structure's movement in a direction of travel, and the fluid's movement in the opposite direction, and it is believed that this out of phase motion contributes to the damping effect of the system 420.

Those skilled in the art would also appreciate that, when the tower structure vibrates, the shift between movement of the structure "4S" in the first direction to movement thereof in the second direction is relatively rapid. As noted above, that corresponds to a change in direction of travel of the fluid 430 (i.e., from the first direction to the second direction). Also, the vibration of the tower structure 410 may persist for some time, with the dampening of such vibration causing a gradual decrease in the amplitude of the vibration until the vibration ceases.

From the foregoing, it can be seen that, while the tower structure vibrates, it is frequently changing its direction of travel. It is believed that the sloshing motion of the fluid changes its direction of travel as quickly as the structure "4S" over time. This also enhances the damping effect of the system 420.

As noted above, the vibration of the tower structure 410 may be initiated, for example, by wind.

It will be understood that the outer tank depth 470 may be any suitable depth. However, in one embodiment, the preselected outer ring height 466 is approximately 50 percent of the preselected outer tank depth 470 of the fluid 430.

It will be understood that the size of each of the outer tank compartments 448 is determined by the natural frequency of the tower structure 410 that is desired to be suppressed or attenuated.

As can be seen in FIG. 4B, in one embodiment, the preselected outer tank depth 470 of the fluid 430, and the preselected outer ring height 466 preferably are the same, or substantially the same, in each of the outer tank compartments 448.

The outer tank compartments 448 are the same size, and the preselected outer tank depth 470 and the preselected outer ring height 466 are the same in each, so that the fluid in all the outer tank compartments 448 collectively constitutes a relatively large mass of the fluid 430 that is movable at the selected frequency.

The fluid 430 may be any suitable fluid. In one embodiment, the fluid 430 preferably includes a mixture of water and an anti-freeze liquid. For example, the anti-freeze liquid may be glycol.

The water and the anti-freeze liquid may be mixed together in any suitable proportions. For instance, in one embodiment, the fluid 430 preferably includes approximately 40 percent water by mass and approximately 60 percent anti-freeze liquid by mass.

Figure 7A:
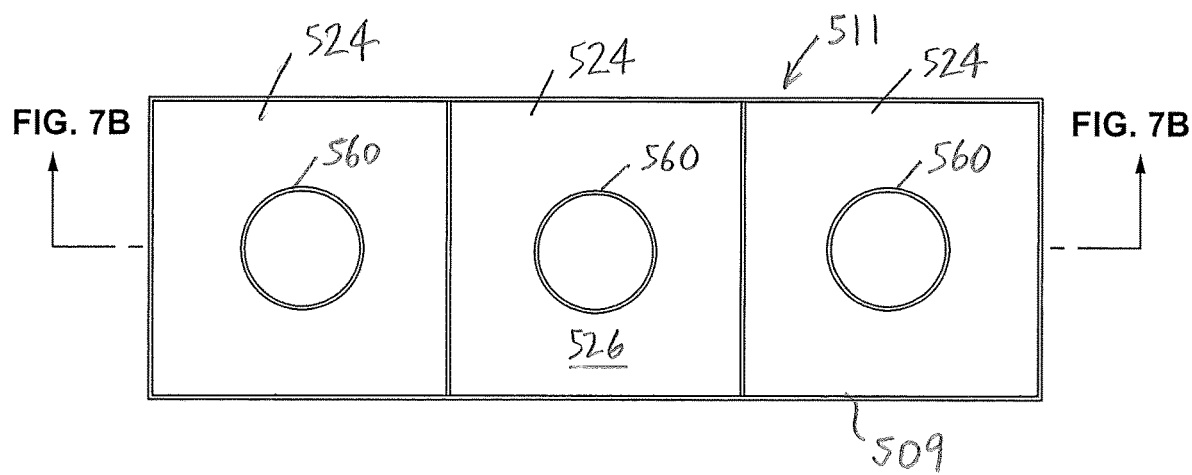
FIG. 7A is a top view of a subassembly of another alternative embodiment of the system of the invention, drawn at a smaller scale.

As noted above, the tower structure may be generally round in cross-section, or triangular. In FIGS. 7A-7D, an embodiment of the system 520 of the invention (FIG. 7C) is illustrated that is configured to be positioned on a tower structure 510 (FIG. 7C) that, in cross-section, has the general outline of an equilateral triangle. The tower structure 510 has three sides 503, 505, 507 (FIG. 7C). The system 520 is for damping vibration of the tower structure 510 that extends between a base (not shown) and a top end 514 thereof, at one or more natural frequencies of the tower structure 510.

As can be seen in FIG. 7C, the system 520 is configured to fit onto the three-sided tower structure 510.

In one embodiment, the system 520 preferably includes a tank assembly 522. Preferably, the tank assembly 522 includes one or more tanks 524 with one or more floors 526 and one or more walls 509. As will be described, in one embodiment, each of the tanks 524 preferably is square in plan view.

As illustrated in FIG. 7C, the tank assembly 522 preferably includes three groups 511A, 511B, 511C of tanks 524, as will be described. It will be understood that the system is designed to suppress or attenuate vibration of the tower structure 510 at a selected natural frequency thereof.

Figure 7B:
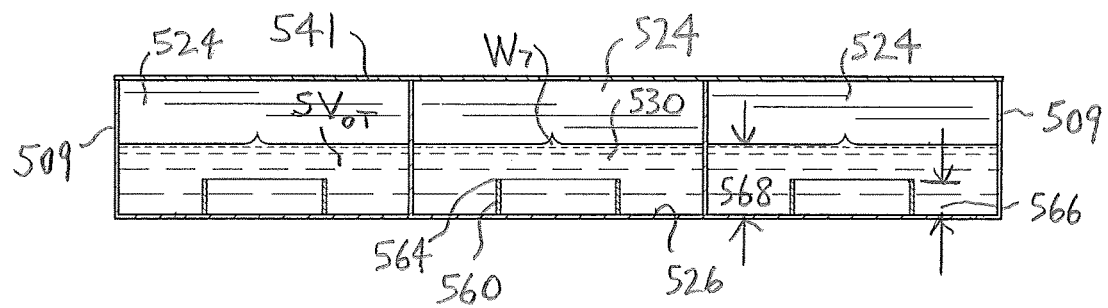
FIG. 7B is a cross-section of the subassembly of FIG. 7A.
Figure 7C:
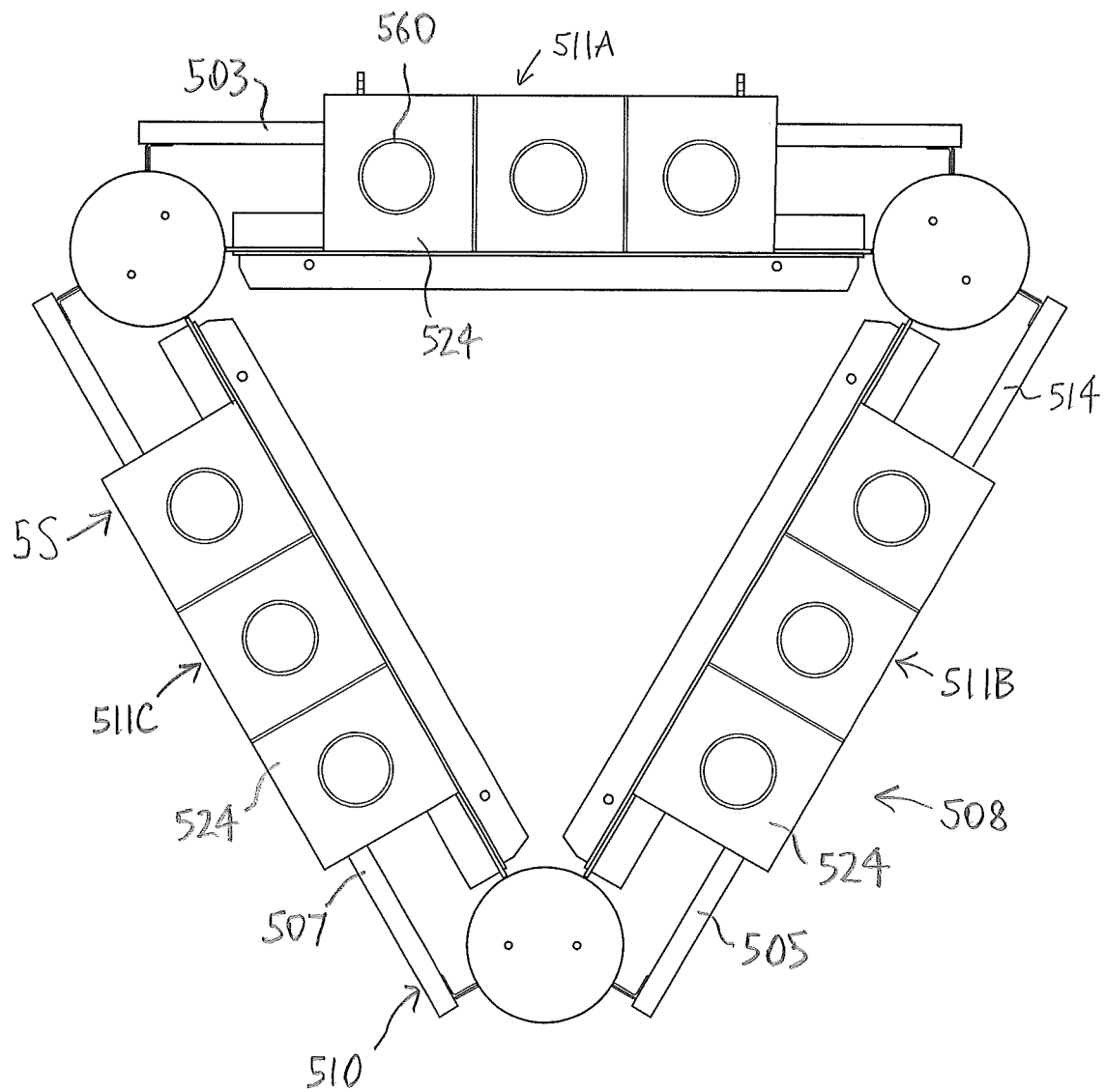
FIG. 7C is a top view of an embodiment of the system of the invention including the subassembly of FIG. 7A mounted on a three-sided tower structure, drawn at a smaller scale.

Preferably, the system 520 also includes a fluid 530 positioned in the tank(s) 524 to a preselected depth 568 above the floor 526 (FIG. 7B). The fluid in the tank 524 occupies a tank volume identified by reference character "$5V_T$" (FIG. 7B). Preferably, the system 520 also includes one or more inserts 560, each of the inserts 560 being centrally located in a selected one of the tanks 524, on the floor 526. The insert 560 preferably has a top edge 564 thereof at a preselected height 566 above the floor 526 (FIG. 7B).

Preferably, the tank compartment wall 509 is formed to define an average tank compartment travelling distance "$TD_7$" of a tank compartment wave "$W_7$" through the fluid 530 in the tank 524.

The preselected depth 568 is greater than the preselected height 566 of the insert 560, to enable the tank compartment wave "$W_7$" to move through the fluid located in the tank 524 above the preselected height 566 of the insert 560 at a selected frequency.

The preselected depth 568 and the average travelling distance "$TD_7$" preferably are selected so that the fluid 530 constituting the tank volume "$5V_{OT}$" is movable at the frequency that is the natural frequency of the tower structure that is to be suppressed. The fluid's movement is out of phase with the vibration of the tower structure at the natural frequency that is to be suppressed or attenuated, to dampen the vibration of the tower structure 510.

As can be seen in FIG. 7A, in one embodiment, the tank assembly 522 preferably includes a number of the square tanks 524. It will be understood that the system 520 may include tanks that have any suitable configuration, e.g., the tanks 524 may be square, round, semi-square, or semi-round in plan view. Preferably, the square tanks 524 are arranged in a group 511 in the tank assembly 522 (FIG. 7A). As will be described, each of the groups 511 preferably is configured to fit on a selected one of the sides 503, 505, 507 of the tower structure 510. The fluid 530 in all of the square tanks 524 is movable at the same frequency as the selected natural frequency of the tower structure 510, but the fluid is moved at such frequency out of phase with the movement of the structure, to dampen the vibration of the tower structure 510.

For convenience, the three groups of tanks in the tank assembly 522 are identified in FIG. 7C by reference characters 511A, 511B, and 511C. The groups identified by reference characters 511A, 511B, and 511C are mounted on the sides 503, 505, and 507 of the tower structure 510 respectively (FIG. 7C). It will be understood that, for the purposes hereof, the structures of the groups 511, and the fluid 530 therein, are substantially identical.

It is also preferred that the tank assembly 522 includes one or more cover portions 541, covering the tanks 524 (FIG. 7B). As can be seen in FIG. 7B, the cover portion 541 preferably is secured to, and at least partially supported by, the walls 509 of each tank 524. In one embodiment, the cover portion 541 preferably includes one or more openings therein (not shown) through which the fluid 530 may be introduced into the tanks 524.

It will be understood that the cover portions 541 and the fluid 530 are omitted from FIGS. 7A, 7C, 7D, and 7E, for clarity of illustration.

The system 520 may be located on the tower structure 510 at any suitable location. As can be seen in FIG. 7C, in one embodiment, it is preferred that the tank assembly 522 is configured to be located on the tower structure 510 proximal to the top end 514 of the tower structure 510. Locating the system 520 at the top end 514, or proximal thereto, permits the system 520 to have the greatest impact possible on the vibration of the tower structure. This is because, when the tower structure vibrates, the amplitude of such vibration is the greatest at the top end 514 of the tower structure 510.

It will be understood that, when the system 520 is mounted on the tower structure 510, the tank assembly 522 is secured to the tower structure 510, by any suitable means. For the purposes hereof, the tower structure 510, and the tank assembly 522 secured to it, are collectively referred to as a structure "5S", for convenience (FIG. 7C).

As noted above, the vibration of the tower structure 510 may be initiated, for example, by wind.

Figure 7D:
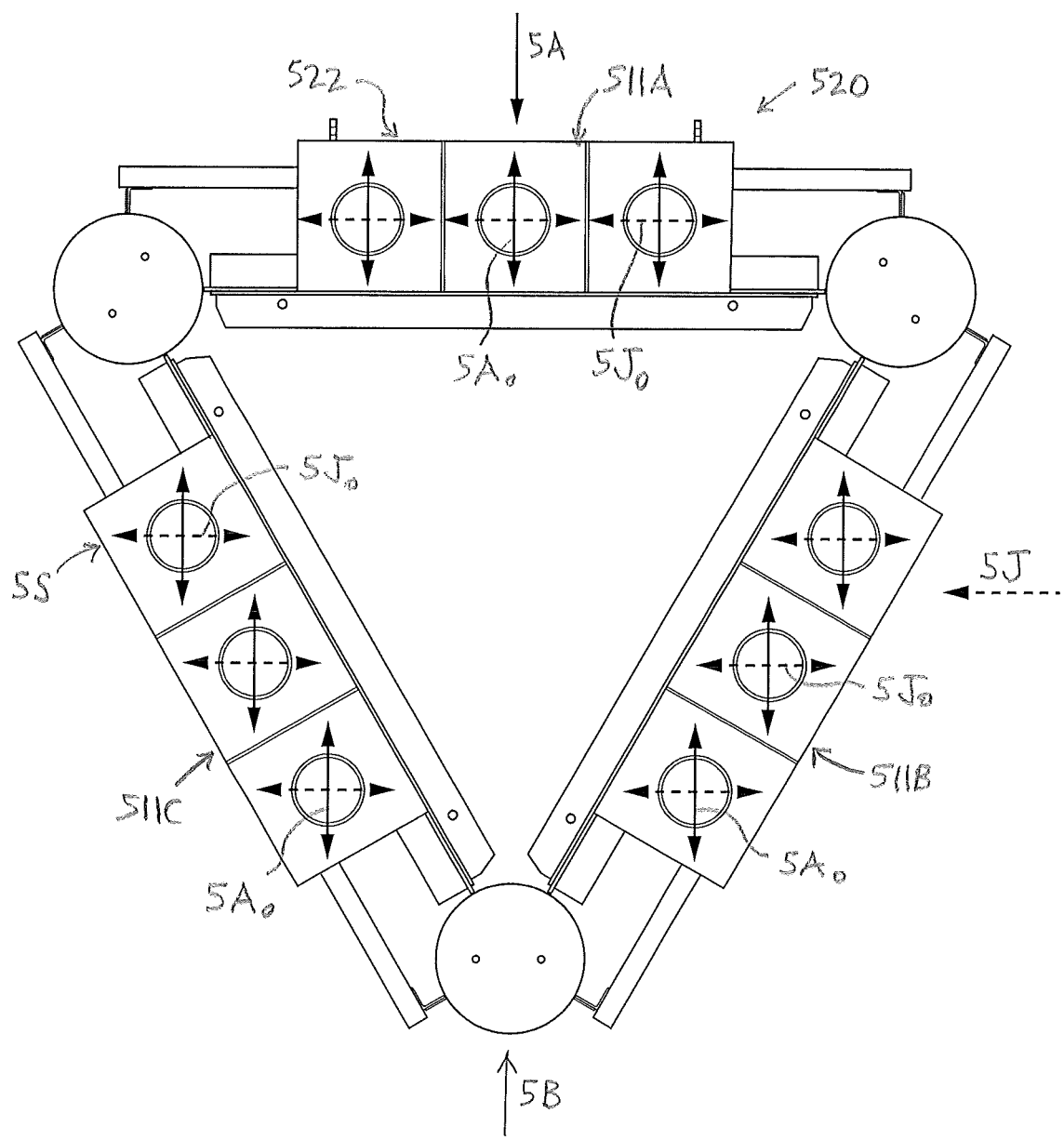
FIG. 7D is another top view of the system of FIG. 7C.

For instance, if the structure "5S" is initially moved in a first direction indicated by arrow "5A" in FIG. 7D, then the fluid 530 is moved in a direction opposite to the first direction. However, due to the average travelling distance "$TD_7$" and the depth 568 of the fluid 530, the fluid 530 in all the tanks 524 moves at the fluid frequency that is the same as the natural frequency of the tower structure 510 that is to be controlled. Accordingly, the movement of the fluid 530 in the tank 524 in response to movement of the tower structure 510 at the natural frequency, dampens such vibration of the tower structure 510.

It will be understood that the tank assembly 522, being secured to the tower structure 510, moves with the tower structure. However, it is believed that the fluid 530 commences moving in the opposite direction at the same time as the structure "5S" begins to move. The sloshing motion of the fluid 530 is in the opposite direction at that point, so that its movement is out of phase relative to the movement of the tower structure in the first direction. Part of the damping effect of the system 520 may be attributed to the out of phase motion with respect to the structure "5S" (i.e., the tower structure, and the tank assembly secured to it).

The travelling distance of the outer tank compartment wave "$W_7$" in each respective tank 524 is approximately the same but may differ slightly, depending on the direction of movement of the fluid. Because of this, the travelling distance "$TD_7$" in each of the tanks 524 is an average of the travelling distances inside the tank 524. For example, the movement of the fluid in the tank 524 in response to the force represented by arrow "5A" is represented by arrows "$5A_O$". The corresponding movement resulting from the force represented by arrow "5J" is illustrated by arrows "$5J_O$". It can be seen in FIG. 7D that, depending on the position of a selected tank 524 relative to the direction of the force applied to the structure, the travelling distance of the fluid in the selected tank 524 is approximately the same but may vary slightly.

In this example, after the structure "5S" is initially moved in the first direction, it then moves subsequently in a second direction indicated by arrow "5B" in FIG. 7D, i.e., the tower structure 510 is vibrating. However, when the tower structure 510 moves in the second direction, then the fluid 530 also moves in a direction opposite to the second direction, in the tank 524. Accordingly, the movement of the fluid 530 in response to the movement of the structure "5S" in the second direction also tends to dampen the vibration of the tower structure at the natural frequencies.

Also, it is believed that, when the structure "5S" (i.e., the tower structure, and the tank assembly secured to it) changes its direction of travel (i.e., from the first direction to the second direction), the fluid 530 is still moving opposite to the first direction. Once again, there is out of phase difference between the structure's change in direction of travel, and the fluid's change in direction, and it is believed that this out of phase motion contributes to the damping effect of the system 520.

Those skilled in the art would also appreciate that, when the tower structure vibrates, the shift between movement of the structure "5S" in the first direction to movement thereof in the second direction is relatively rapid. As noted above, that corresponds to a change in direction of travel of the fluid 530 (i.e., from opposite to the first direction, to opposite to the second direction). Also, the vibration of the tower structure 510 may persist for some time, with the dampening of such vibration causing a gradual decrease in the amplitude of the vibration until the vibration ceases.

From the foregoing, it can be seen that, while the tower structure vibrates, it is frequently changing its direction of travel. It is believed that the sloshing motion of the fluid also changes its direction of travel at the same frequency as the structure "5S" over time. That also enhances the damping effect of the system 520.

It will be understood that the fluid depths 568 may be any suitable depths. However, in one embodiment, the preselected ring height 566 is approximately 50 percent of the preselected depth 568 of the fluid 530. It will also be understood that the dimensions of the tanks 524 are determined by the frequency (in this example, the natural frequency) that is to be suppressed or attenuated.

As can be seen in FIG. 7B, in one embodiment, the preselected depth 568 of the fluid 530, and the preselected ring height 566 preferably are the same, or substantially the same, in each of the tanks 524.

The fluid 530 may be any suitable fluid. In one embodiment, the fluid 530 includes a mixture of water and an anti-freeze liquid. For example, the anti-freeze liquid may be glycol.

The water and the anti-freeze liquid may be mixed together in any suitable proportions. For instance, in one embodiment, the fluid 530 preferably includes approximately 40 percent water by mass and approximately 60 percent anti-freeze liquid by mass.

The invention preferably also includes a tower system 508 (FIG. 7C), which includes the system 520 and the tower structure 510.

Those skilled in the art would appreciate that, in order to determine the one or more natural frequencies of the tower structure, it is preferred that such determination may be made by measurements of the tower structure, when vibrating. Those skilled in the art would also appreciate that it is also necessary to assess the extent to which the vibration of the tower structure is affected by structural damping.

Figure 8:
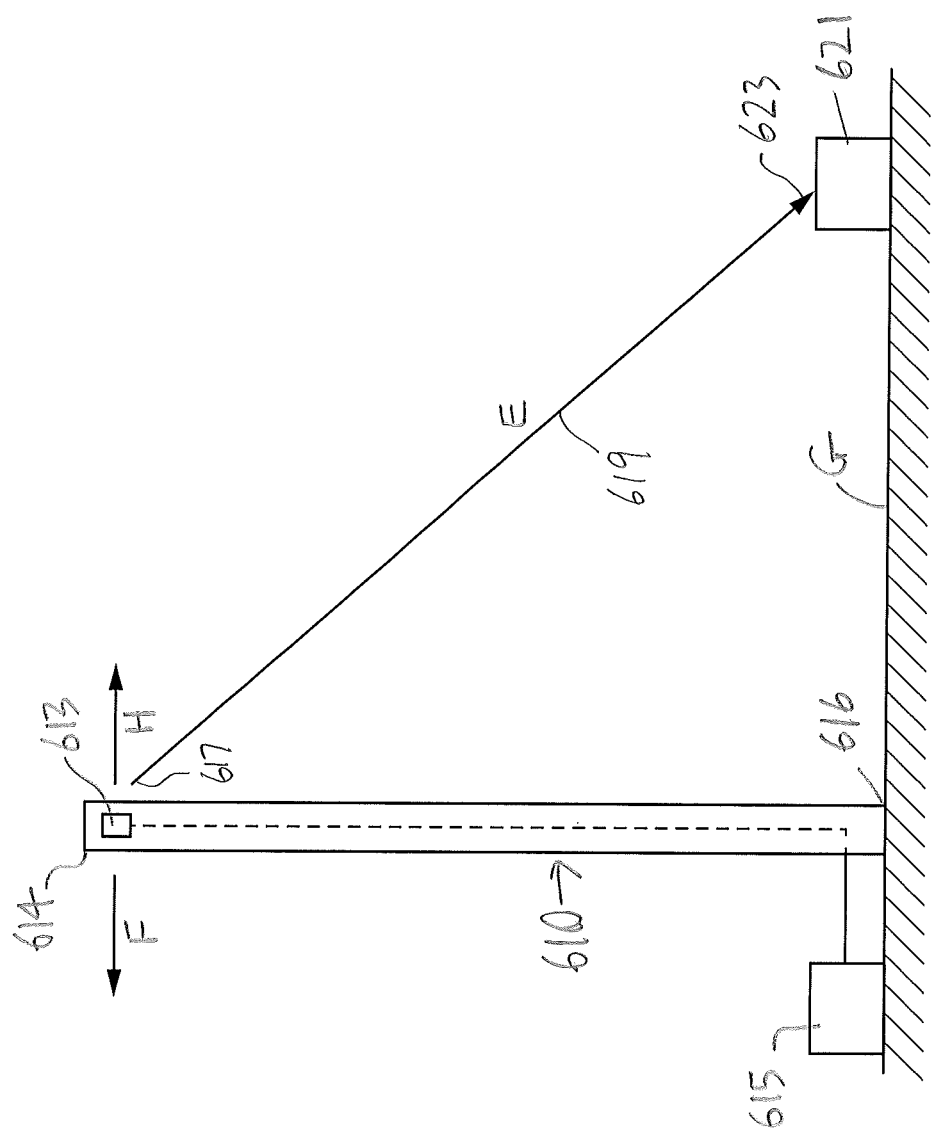
FIG. 8 is a schematic illustration of a prior art tower structure with an accelerometer mounted thereon, drawn at a smaller scale.

Preferably, the invention includes a method of determining the one or more natural frequencies of a tower structure 610 of the prior art, as well as a method of measuring the structural damping that is associated with one or more of the natural frequencies. As can be seen in FIG. 8, the tower structure 610 extends above ground level "G" between a base 616 at the ground level and a top end 614. In one embodiment, the method includes, first, securing an accelerometer 613 to the tower structure 610 at one or more locations at the top end 614, or proximal to the top end 614. The tower structure 610 is then vibrated, as will be described.

With the accelerometer 613, acceleration data resulting from vibration of the tower structure 610 is obtained. The acceleration data is transmitted from the accelerometer 613 to a processor 615. With the processor 615, the acceleration data is processed to determine the one or more natural frequencies and the corresponding structural damping. Preferably, in such processing, digital filters are used to separate the measured data signal into separate signals, each such signal representing the attenuation of a signal under a different natural frequency.

As noted above, the tower structure 610 is relatively tall and slender. Preferably, a first end 617 of flexible element 619 is attached to the top end 614 of the tower structure 610. A pulling device 621 is attached to a second end 623 of the flexible element 619 (FIG. 8). The pulling device 621 pulls on the flexible element 619 in the direction indicated by arrow "E" in FIG. 8, causing the top end 614 to be bent in the direction that the pulling device 621 pulls.

Preferably, once the top end 614 has been pulled in the direction of arrow "E" to a predetermined initial position, the flexible element 619 is quickly released by the pulling device 621. Due to the sudden release of the top end 614, the tower structure 610 vibrates, in the directions indicated by arrows "F" and "H" in FIG. 8.

Those skilled in the art would be aware of suitable pulling devices 621, and also of suitable flexible elements 619.

As noted above, the acceleration data, which indicates the vibrating behavior of the tower structure, is then processed by the processor 615 to determine the one or more natural frequencies of the tower structure 610. The acceleration data may be transmitted to the processor 615 via any suitable means. Those skilled in the art would be aware of suitable software for analyzing the acceleration data in the frequency domain in order to determine the one or more natural frequencies of the tower structure 610. Also, the acceleration data is analyzed in the time domain to determine a damping ratio of the tower structure 610, by using digital filters to separate the measured data signal into separate signals, each representing the attenuation of the signal under a different natural frequency.

Figure 9:
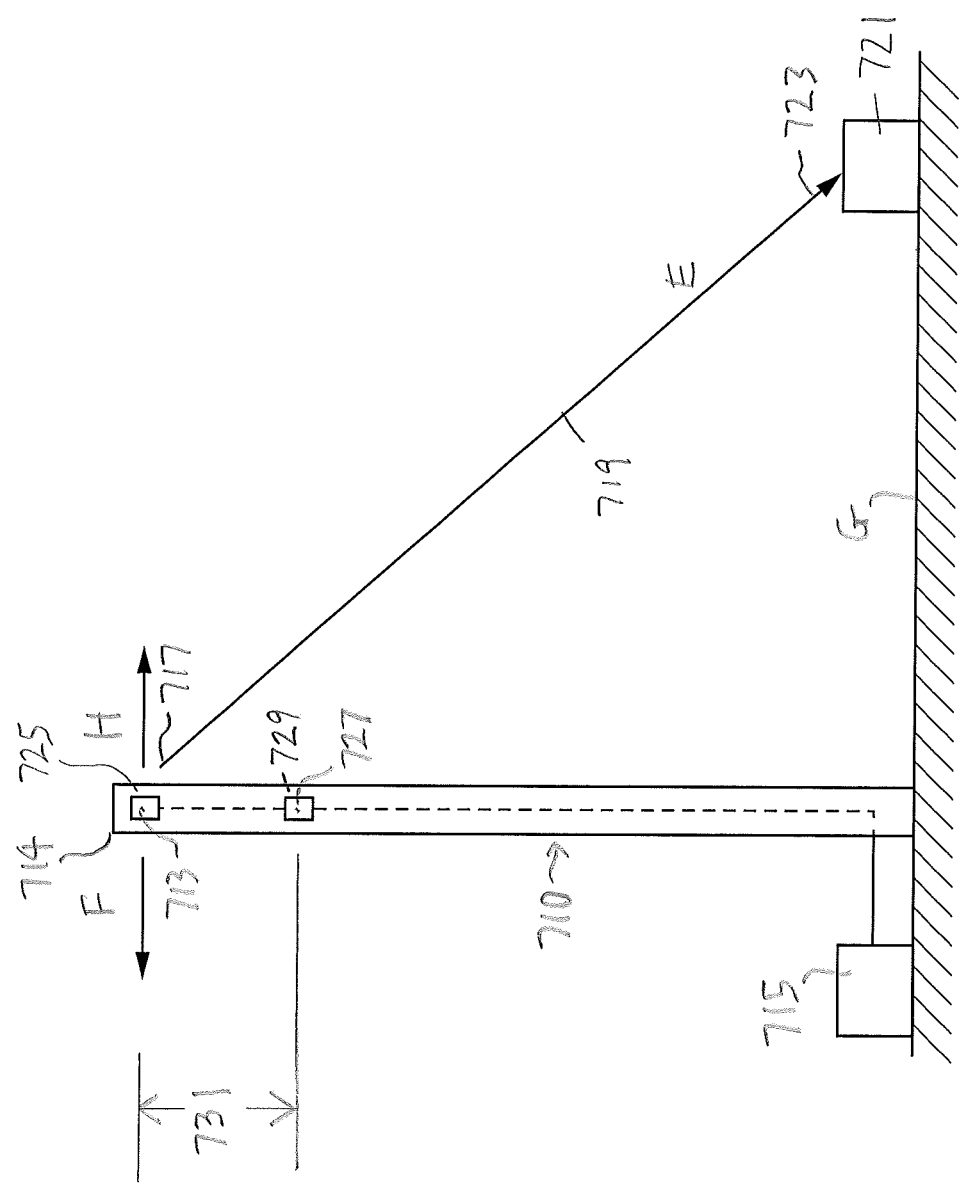
FIG. 9 is a schematic illustration of a prior art tower structure with two accelerometers mounted thereon.

In an alternative embodiment, schematically illustrated in FIG. 9, two accelerometers may be utilized. In this embodiment, a first accelerometer 713 is secured to a tower structure 710 at a first location 725 proximal to a top end 714, and a second accelerometer 727 is secured to the tower structure 710 at a second location 729 a preselected distance 731 below the top end 714. Next, the tower structure 710 is vibrated.

With the first accelerometer 713, first location acceleration data is obtained at the first location 725 resulting from vibration of the tower structure 710. With the second accelerometer 727, second location acceleration data is obtained at the second location 729 resulting from vibration of the tower structure 710. The first and second location acceleration data is transmitted from the first accelerometer 713 and the second accelerometer 727 respectively to a processor 715. With the processor 715, the first and second location acceleration data is processed to determine the one or more natural frequencies and the associated structural damping of the tower structure 710. Preferably, in such processing, digital filters are used to separate the measured signals into separate signals, each representing the attenuation of the signal under a different natural frequency.

In one embodiment, in order to cause the tower structure 710 to vibrate at the one or more natural frequencies, a first end 717 of a flexible element 719 is attached to the top end 714, and a pulling device 721 is attached to a second end 723 of the flexible element 719. The pulling device 721 pulls on the flexible element 719 in the direction indicated by arrow "E", to move the top end 714 toward the pulling device 721, and then suddenly releases the flexible element 719, thereby causing the top end 714 to vibrate, as indicated by arrows "F" and "H" in FIG. 9.

The first and second acceleration data preferably is transmitted to the processor 715 by any suitable means. Those skilled in the art would be aware of suitable software for analyzing the first and second acceleration data in order to determine the one or more natural frequencies of the tower structure 710.

Figure 10:
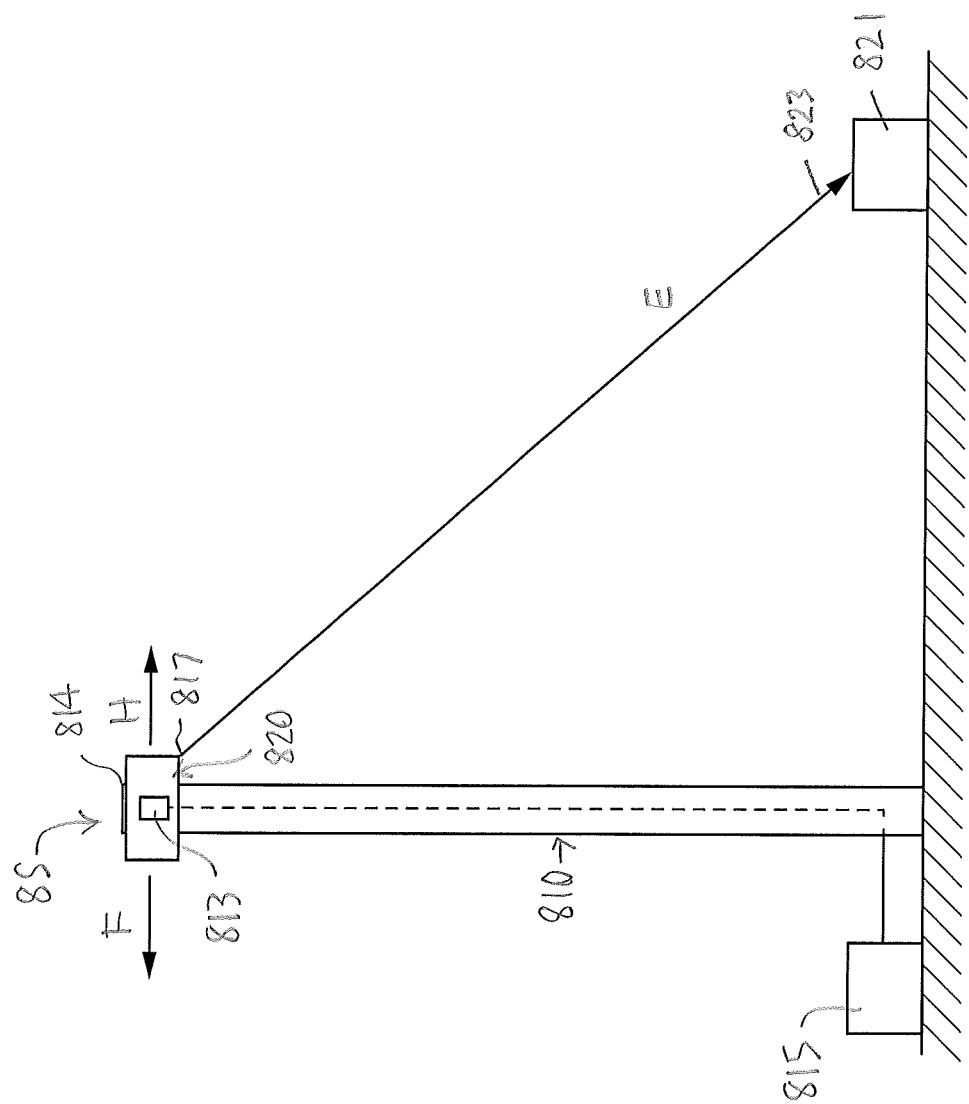
FIG. 10 is a schematic illustration of the tower structure including the system installed thereon, and an accelerometer secured to the tower structure.

Those skilled in the art would appreciate that, once an embodiment of the tank assembly of the system of the invention has been secured to a tower structure 810, the natural frequency (or natural frequencies) of the overall structure "8S" (FIG. 10) differs slightly from the natural frequency (or natural frequencies) of the tower structure 810 alone. Also, the installation of the damping system of the invention on the tower structure provides a significant enhancement or increase to the structural damping of the structure (i.e., the tower structure, and the tank assembly). It will be understood that a tank assembly 822 of the system 820 is secured to the tower structure 810 (FIG. 10). It will also be understood that the structure "8S" includes the tower structure 810 and the tank assembly 822 of the system 820.

Those skilled in the art would appreciate that the structure "8S", once the fluid (not shown) has been introduced into the tank assembly, the structural damping of the overall structure will be increased. The purpose of the assessment of the structure "8S" is to determine, after the system 820 has been installed, whether adjustments to the system 820 should be made, so that it may dampen vibration of the structure more effectively.

Accordingly, the invention includes a method of assessing the system 820 for damping vibration of the tower structure 810 at one or more natural frequencies thereof. As can be seen in FIG. 10, the system 820 preferably is mounted at a top end 814 of the tower structure 810. The method includes securing an accelerometer 813 to the structure "8S" at a location that is proximal to the top end 814 of the tower structure 810. The structure 810, with the system 820 installed thereon, is vibrated.

In one embodiment, in order to cause the structure 810 to vibrate, a first end 817 of a flexible element 819 is attached to the top end 814, and a pulling device 821 is attached to a second end 823 of the flexible element 819. The pulling device 821 pulls on the flexible element 819 in the direction indicated by arrow "E", to bend the top end 814 toward the pulling device 821, and then suddenly releases the flexible element 819, thereby causing the top end 814 to vibrate, as indicated by arrows "F" and "H" in FIG. 10.

With the accelerometer 813, acceleration data is obtained resulting from vibration of the structure "8S". The acceleration data is transmitted from the first accelerometer 813 to a processor 815.

With the processor 815, the acceleration data is processed to determine the one or more actual frequencies of vibration of the structure "8S" as well as the corresponding structural damping.

In addition, with the processor, the one or more actual measured structural damping and frequencies are compared to the one or more initial structural damping and theoretical frequencies. Based on such comparisons, suitable adjustments to the system 820 may be determined. It is preferred that this process is repeated until the damping that is effected by the system 820 is satisfactory.

Alternatively, more than one accelerometer may be utilized.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

What is claimed is:

1. A system for damping vibration of a tower structure, the system comprising:
    a tank having a floor and a wall;
    a fluid positioned in the tank to a depth above the floor;
    a circular ring located in the tank for damping movement of the fluid, the circular ring including a solid wall having a height above the floor; and
    the depth of the fluid being greater than the height of the solid wall to enable a wave to move through the fluid located in the tank above the solid wall of the circular ring.

2. The system according to claim 1 in which the circular ring is centrally located on the floor.

3. The system according to claim 1 in which the height of the solid wall is approximately 50 percent of the depth of the fluid.

4. The system according to claim 1 in which the fluid comprises a mixture of water and an anti-freeze liquid.

5. The system according to claim 1 in which the tank is configured to be located proximal to a top end of a tower structure.

6. The system according to claim 1 in which the wall of the tank is an outer perimeter wall defined by an outer perimeter radius centered on a center point of the tank.

7. The system according to claim 1 wherein the tank is an inner tank and the wall is an intermediate wall, the system further including an outer tank having an outer perimeter wall, the system further including a plurality of outer tank compartments, each outer tank compartment being defined by first and second walls between the intermediate wall and the outer perimeter wall.

8. The system according to claim 7 wherein the circular ring is an inner circular ring, the system further including a plurality of outer circular rings each within one of the plurality of outer tank compartments.

9. The system according to claim 8 wherein the fluid is in each of the plurality of outer tank compartments at a depth greater than a height of the outer circular ring within the associated outer tank compartment.

10. The system according to claim 9 in which the height of the outer circular rings is approximately 50 percent of the depth of the fluid in each outer tank compartment respectively.

11. The system according to claim 8 in which the height of the inner circular ring is approximately 50 percent of the depth of the fluid in the inner tank.

12. The system according to claim 7 in which the intermediate wall is a first intermediate wall, the system further including a second intermediate wall between the first intermediate wall and the outer perimeter wall, wherein the plurality of outer tank compartments include a plurality of first outer tank compartments between the outer perimeter wall and the second intermediate wall and a plurality of second outer tank compartments between the second intermediate wall and the first intermediate wall.

13. The system according to claim 12 wherein the circular ring is an inner circular ring, the system further including a plurality of outer circular rings each within one of the plurality of first outer tank compartments or one of the plurality of second outer tank compartments, and wherein the fluid is in each of the plurality of first outer tank compartments and the plurality of second outer tank compartments at a depth greater than a height of the outer circular ring within the associated first outer tank compartment or second outer tank compartment.

14. The system according to claim 1 wherein the wall of the tank has straight portions perpendicular to one another.

15. The system according to claim 14 wherein the wall of the tank is square.

16. The system according to claim 1 wherein the tank is first tank and the wall is a first wall, the system further including a second tank adjacent the first tank and a second circular ring within the second tank, the fluid within the second tank at a depth higher than a height of the second circular ring.

17. The system according to claim 16 wherein the second tank has a second wall and wherein the first wall and the second wall have a shared portion.

18. The system according to claim 1 wherein a first portion of the wall of the tank has a curvature with a first radius about a point away from the tank and wherein an opposite portion of the wall of the tank has a curvature with a second radius about the point.

19. The system according to claim 1 wherein the tank is a first tank of a plurality of tanks each having a floor and a wall, each of the walls of the plurality of tanks having a first portion with curvature with a first radius about a point outside the respective tank and an opposite second portion with curvature with a second radius about the point.

* * * * *